US011887148B2

(12) United States Patent
Ericson et al.

(10) Patent No.: US 11,887,148 B2
(45) Date of Patent: *Jan. 30, 2024

(54) CROSS-PLATFORM TRACKING OF USER GENERATED DATA FOR UNIFIED DATA OUTPUT

(71) Applicant: PAYPAL, INC., San Jose, CA (US)

(72) Inventors: Braden Christopher Ericson, San Jose, CA (US); Joshua Greenwell, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 256 days.

This patent is subject to a terminal disclaimer.

(21) Appl. No.: 17/347,387

(22) Filed: Jun. 14, 2021

(65) Prior Publication Data
US 2021/0350406 A1 Nov. 11, 2021

Related U.S. Application Data

(63) Continuation of application No. 15/858,107, filed on Dec. 29, 2017, now Pat. No. 11,037,187.

(51) Int. Cl.
*G06Q 30/00* (2023.01)
*G06Q 30/0207* (2023.01)
*G06Q 30/0601* (2023.01)

(52) U.S. Cl.
CPC ..... *G06Q 30/0239* (2013.01); *G06Q 30/0633* (2013.01)

(58) Field of Classification Search
CPC .............. G06Q 30/0239; G06Q 30/0633
See application file for complete search history.

(56) References Cited

U.S. PATENT DOCUMENTS

2005/0051615 A1 3/2005 Farley et al.
2005/0222931 A1* 10/2005 Mamou .................. G06Q 10/10
705/35

(Continued)

OTHER PUBLICATIONS

J. Suryaprasad, B. O. P. Kumar, D. Roopa and A. K. Arjun, "A Novel Low-Cost Intelligent Shopping Cart," 2011 IEEE 2nd International Conference on Networked Embedded Systems for Enterprise Applications, Perth, WA, Australia, 2011, pp. 1-4, doi: 10.1109/NESEA.2011.6144946. (Year: 2011).*

(Continued)

*Primary Examiner* — Sun M Li
(74) *Attorney, Agent, or Firm* — Haynes and Boone, LLP

(57) ABSTRACT

There are provided systems and methods for cross-platform tracking of user generated data for unified data output. A computing device may be utilized to access an online platform and perform one or more processes, including viewing an online marketplace to purchase items in a transaction. The device may be used to browse items and items may be added to a digital shopping cart or other checkout process and interface. However, the device may not finish electronic transaction processing for the items and may abandon the digital cart on a first platform used by the user. When a user uses a second online platform to shop and generate another digital cart, a cross-platform process may retrieve the previously abandoned cart's data, and may generate output for display of the previous cart with the new cart in the second platform's user interface.

20 Claims, 7 Drawing Sheets

(56) References Cited

U.S. PATENT DOCUMENTS

| | | | | |
|---|---|---|---|---|
| 2006/0041485 A1* | 2/2006 | Tarvydas | ............ | G06Q 30/0609 |
| | | | | 705/26.62 |
| 2015/0120508 A1* | 4/2015 | Black | ................. | G06Q 30/0635 |
| | | | | 705/26.81 |
| 2017/0193591 A1* | 7/2017 | Narasimhan | ........ | G06Q 30/0641 |
| 2017/0256000 A1* | 9/2017 | Isaacson | ................ | G06Q 50/01 |
| 2021/0350443 A1* | 11/2021 | Isaacson | ............... | G06Q 20/401 |

OTHER PUBLICATIONS

A Method and System for Offering Promotions on Products Abandoned in Virtual Shopping Carts An IP.com Prior Art Database Technical Disclosure Authors et al.: Taruja Parande, IP.com No. IPCOM000225937D IP.com Electronic Publication Date: Mar. 14, 2013 (Year: 2013).*

"Using association rules to assess purchase probability in online stores", by Grazyna Suchacka and Grzegorz, Chodak, in Springer Link, Sept. 6, 2016, (hereinafter, GS). (Year: 2016).*

K. Renaud, T. Cockshott and M. Hair, "Everyone Abandons—Eventually: Understanding the Online Shopping Experience," 2009 IEEE Conference on Commerce and Enterprise Computing, Vienna, Austria, 2009, pp. 245-251, doi: 10.1109/CEC.2009.22. (Year: 2009).*

* cited by examiner

200a

Pay Provider 1001

🛒 $441.84 USD ⌄ — 1002

Hi, Alice Not you? — 1004

Ship to — 1006　　　　　Change >
Alice
123 West St. LA, CA
United States

Pay with — 1008　　　　Change >
x-5555
PREFERRED

1010

[ Continue ]

---

Complete your Additional Purchase — 1012

Ship to
123 West St. LA, CA ← 1014　　　　Edit

| Get it by Mon. Sep 26 | | |
|---|---|---|
| 🏠 | Home White/Slate fabric | $ 129.00 Qty 1 Remove |

| Get it by Mon. Sep 26 | | |
|---|---|---|
| 📺 | TV Cast Black | FREE Qty 1 Remove |

⎱ 1016

Item Subtotal　　　　　　　　$ 129.00
Shipping　　　　　　　　　　FREE
Estimated Sales Tax　　　　　　$ 11.61
+ Use a Best Buy Tax Excerpt Quick Card
_____
Total　　　　　　　　　　　$140.61

⎱ 1018

[ Add to Checkout ] ← 1020

FIG. 2A

CROSS-PLATFORM TRACKING OF USER GENERATED DATA FOR UNIFIED DATA OUTPUT

CROSS REFERENCED TO RELATED APPLICATIONS

This application is a continuation of U.S. application Ser. No. 15/858,107, filed on Dec. 29, 2017, which is incorporated by reference in its entirety.

TECHNICAL FIELD

The present application generally relates to online platforms and more specifically to tracking and storing of input and online interactions across multiple online platforms.

BACKGROUND

Device applications may be utilized by users to engage with online resources, including online merchant marketplaces and other electronic shopping forums that allow users to purchase items in an electronic transaction. During use of a device application, input and processes may be used to navigate to one or more online platforms and perform processes, including interacting with an online platform to perform and complete one or more processing tasks. Such interactions may include shopping for items on an online marketplace or with an online merchant, which may provide the online platform through a website or dedicated application of the merchant or a plurality of merchants that allow purchase of the merchant's items through an online service. However, during use of an online process, a user may not complete the process, for example, by abandoning the process so that the process is not completed, which may include abandonment of a shopping or checkout process having one or more items for purchase in a digital shopping cart. In such cases, the merchant providing the item in the shopping cart may therefore not convert the process into a completed sale of the item, and may not be able to output data and notifications to the user that remind the user of the pending and abandoned process, resulting in a loss of a sale to the merchant. Moreover, the merchant and/or user may not retain data necessary to reenter the process or recall data for the pending/abandoned processes for completion at a future time. The user may also engage in similar processes with other platforms, but may not remember the previous process to return to and complete the transaction, which can result in a loss for both the consumer and merchant and may at least cause inconvenience to the consumer in taking the time to recreate the desired transaction or process.

BRIEF DESCRIPTION OF THE DRAWINGS

FIG. 2A is an exemplary user interface of a device displaying a current checkout interface for a current shopping cart that further includes display data for a past shopping cart for completion in a unified process, according to an embodiment;

Figure 1A:
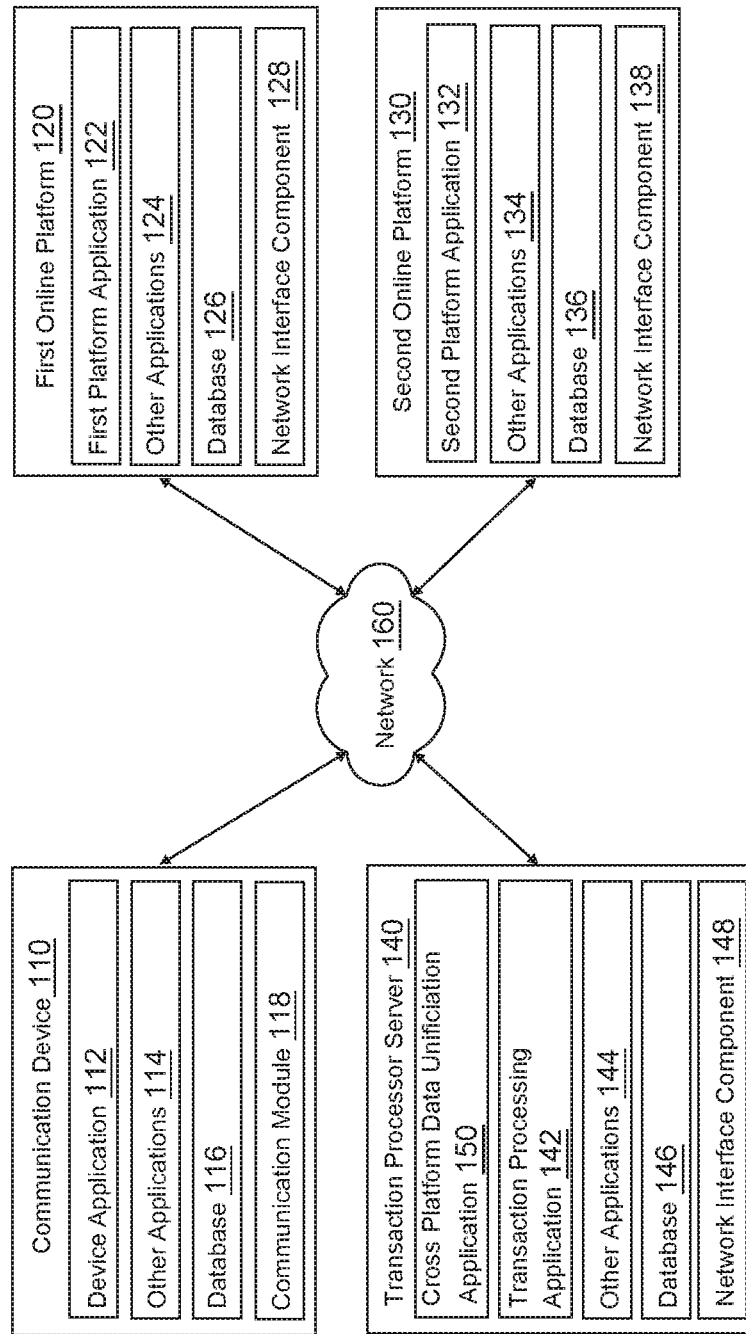
FIG. 1A is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for cross-platform tracking of user generated data for unified data output. Systems suitable for practicing methods of the present disclosure are also provided.

Computing processes may include digital shopping cart generation and electronic transaction processing services for electronic transactions to complete a checkout with these digital shopping carts, including online transactions to purchase one or more items on an online merchant marketplace. Users may generate digital shopping carts through online interactions with posted data. However, prior to completion of a process, the user may abandon the digital shopping cart, for example, by leaving the marketplace through another device interaction/process or discontinuing use of the device. When the user utilizes a service provider to generate another digital shopping cart with another online platform, which may be separate and disparate from the present platform, a service provider may retrieve the abandoned process data for the digital shopping cart, and specifically output data displayable within interfaces of the other platform to view the data. The output data may include processes to retrieve and process the abandoned digital shopping cart. Thus, a unified data view of cross-platform data and processes may be provided.

One or more entities, such as personal users or consumers, groups of users, merchants, businesses, or other commercial agencies, may utilize device applications and/or online resources that may be interacted with through a device to perform one or more computing processes. For example, an application may allow a user to request and receive data, view data, interact with data, and/or transmit data between disparate devices over a network connection. In certain embodiments, the application may correspond to a browser application or dedicated device application that may be used to access an online merchant or online marketplace provided by a merchant platform (e.g., a merchant device, server, or cloud computing architecture) that the user uses to view and purchase items for sale. Thus, the computing processes may correspond to processes to browse and view data or content from the online platform, as well as process electronic transactions for items made available for purchase on the platform. However, other applications may also utilize the processes described herein to provide a unified data output and display across multiple platforms using the processes and service provider described herein.

Various service providers may provide transaction processing services that may allow these two or more entities to engage in electronic transaction processing, including processing of digital shopping carta created by a user or other entity using the online platform providing sales for an online merchant or online marketplace. The digital shopping cart may therefore include the item(s) selected by the entity, e.g. a consumer, for purchase. For example, a payment provider or transaction processor service may offer online electronic transaction processing services that provide transfers, payment services, and other type of financial services including payment account establishment and/or management. These service providers may further provide additional types of benefits, features, and/or processes to users, such as fraud protection, incentives for completing electronic transactions for digital shopping carts, and cross-platform unification of shopping cart data for previously generated shopping carts with currently pending shopping carts, as discussed herein. These electronic transaction processing services may be accessed through an application on the computing device, and may be included within another application or website of another entity (e.g., an online merchant or marketplace) using the services and processes of the service provider.

When utilizing the device, the user may use the application to perform some computing process with an online platform. This interaction with another device, server, or entity (e.g., cloud computing server(s)) may request communication with the separate entity and cause data transmission, retrieval, and/or processing with the remote entity. The use of the application may therefore be linked to one or more processes with the networked or online platform, and the processing with the online platform may be identified by the requested usage and processes of the computing device with the online platform. The device application and/or a service provider providing services to the device application and/or platform may track application usage and processes engaged in and/or executed by the application with the platform, which may include those processes that generate a digital shopping cart during an online shopping session with the platform, and whether the shopping cart is abandoned or completed for later unified output of abandoned shopping carts with pending shopping carts. Thus, the processing with the online platform may correspond to a shopping session that indicates an interest in one or more items, for example, by adding the item(s) to a digital shopping cart for a process to purchase items from an online merchant and/or marketplace and perform electronic transaction processing for the items.

A user using the computing device and an application of the computing device may generate the digital shopping cart through the online platform where the online merchant, marketplace, and/or service provider may allow for generation of the digital shopping cart through browser or dedicated application usage and processes. This may include processes to browse items, select items for purchase, and move the items to a digital shopping cart or other checkout process. The digital shopping cart may therefore be created by a user through user input, and may be generated through use of an account or other identifier for the user, device, and/or application. The application may be used to access one or more interfaces and processes of the online merchant or marketplace to accept user input, enable browsing, and generate the digital shopping cart. For example, a graphical user interface of a device used to access the application, retrieve and display data for the online merchant or marketplace (e.g., through in a website or a dedicated application), transmit data used to generate the digital shopping cart, and allow the user to utilize the application for processing of the digital shopping cart, including accessing an account to checkout and complete an electronic transaction for the digital shopping cart as well as view additional information.

In this regard, in order to utilize an online platform and generate digital shopping carts, as well as process electronic transactions for the items in the digital shopping cart, the user and/or device may be required to generate an account with a merchant and/or service provider for shopping/transaction processing. In various embodiments, the account may be merchant or marketplace specific and the merchant/marketplace may utilize processing services and data unification services provided as described herein. However, in other embodiments, the accounts may be provided by the service provider directly or indirectly (e.g., through establishment through one merchant but servicing and used with multiple merchants), which may provide account services across multiple different and disparate merchant platforms. Thus, in order to process an electronic transaction for a digital shopping cart, the user may require an account with the service provider or other online transaction processor in order to engage in electronic transaction processing with the online merchant or marketplace. The user may be required to provide identification information to establish the account, such as personal information for a user, business or merchant information for such an entity, or other types of identification information including a name, address, and/or other information. The user may also be required to provide financial information, including payment card (e.g., credit/debit card) information, bank account information, gift card information, and/or benefits/incentives, which may be used to provide payment. In order to create an account, the user may be required to select an account name and/or provide authentication credentials, such as a password, personal identification number (PIN), answers to security questions, and/or other authentication information.

Once an account is created, the account may be accessed through a web browser from a website of the service provider and/or a dedicated application of the service provider, such as a mobile smart phone application. The account may be accessed and utilized during use (e.g., shopping) sessions with the online platform, and may provide data storage and accrual functions to monitor processes performed by the device/application and/or actions and user input provided during the use sessions. A token may be issued to the device of the user for their respective account, where the token may include data (which may be encrypted) allowing the service provider to identify the user and their account and authenticate the user. Thus, the token may be transmitted to other entities during transaction processing, which may allow the service provider to identify and authenticate the user's account and engage in transaction processing. Additionally, the online payment provider or other service provider may provide digital wallet services, which may offer financial services to send, store, and receive money, process financial instruments, and/or provide transaction histories. A computing device may execute a transaction processing application, which may be configured to send and receive payments to another party, such as another user and/or a merchant, or otherwise engage in transaction processing. In various embodiments, a website may provide the transaction processing services, and thus may be accessed by a web browser application. The application (or website) may be associated with the service provider, such as PayPal® or other online payment provider service, which may provide payments and the other aforementioned transaction processing services on behalf of users, merchants, and other entities.

During the session of application use that generates the digital shopping cart, user input to the device may request one or more actions to be taken by the device when utilizing the application. For example, user input may be used to request execution of an executable process of the device/application, which causes the device to execute some software task or routine that accomplishes a particular function of the application, service, and/or operating system. These actions may occur after certain application processing, such as after beginning use of the application, executing application processes, and/or communicating data with an online merchant, marketplace, or other entity/resource. For example, after a user utilizes a device to open and execute an application, and begins using the application, the actions may correspond to further user input that requests the device to perform some operation or task. With regard to tasks or operations performed during a shopping use session with an online merchant or marketplace, the actions may correspond to user input associated with browsing the marketplace and generating the digital shopping cart. User input may also cause abandonment of a digital shopping cart on an online platform prior to completion of the digital shopping cart. Abandonment of a digital shopping cart on an online platform may occur where a device or account fails to complete the digital shopping cart by processing an electronic transaction to purchase the items in the digital shopping cart on the online platform, or otherwise arrive at an end processing state for the digital shopping cart. Thus, a digital shopping cart on a first platform may be abandoned prior to being processed and completing a checkout in a transaction.

For example, user input may continue the use or process of the application, or may abandon the current use or process. User input that abandons an executing process within an application may correspond to an operation to navigate to another window or interface, such as utilizing a mouse cursor or keyboard shortcut to close a browser window, exit an application, or navigate to another browser window, tab, or application interface, as well as navigations to other device processes or applications and navigation within the application to other processes or data (e.g., website navigations). Other types of user input abandoning a digital shopping cart having an item may include lacking input of authentication credentials, browsing another item, removing items from the shopping cart, returning to a home screen, locking a device or going into a screensaver, sleep, or standby mode, etc. Abandonment may also be passive, such as if the user fails to perform an action within a certain period of time. If user input (or lack of input) causes abandonment of an application/online service, the service provider may store data for the application/online service that was being used at the time of abandonment, including the executing processes and data for the executing processes such as a current state of such processes, to a database of the service provider. In this regard, where abandonment of an executing process corresponds to abandonment of a digital shopping cart with a first online platform, the service provider may utilize code implemented into the first online platform to determine and receive data for the abandoned digital shopping cart (e.g., items in the cart, discounts, shipping information, payment information, etc.) from the online platform, and may store the data for the abandoned cart to a database of the service provider.

In order to provide detection and storage of past abandoned digital shopping carts generated in a past shopping session, the service provider may provide various processes for online platforms to implement within their framework and services. For example, the service provider may provide an online merchant or marketplace platform (e.g., online service and resource accessible through a website and/or dedicated application) with one or more executable software modules and/or processes that may be implemented within the platform and may "listen" for events and actions that generate a digital shopping cart and/or abandon the digital shopping cart. The merchant and/or service provider may implement a code package, snippet, or other software process within the platform (e.g., website, application, or other accessible resource that the device may interact with), which may detect the process abandonment, and further may listen for or detect data of the executing process so that any data necessary for identifying the executing process and the current state of the process, may be acquired and determined. The code may correspond to a respective version, instance, or particular copy of the code that may be implemented in each different merchant platform, such as code for a specific website or application and/or versions or instances of code for specific merchant requirements. Thus, the code may not be the exact same code, either the same instance of the code or the same copy of the code. For example, the code may correspond to a different instance that is implemented in each respective merchant platform. The code may also be configured, re-coded, or written in a different coding language and/or with different process properties and features to be implemented as required by the merchant platform. However, the code may provide the same or similar functionality in each implemented platform.

Where the abandonment corresponds to a digital shopping cart, data of the status and information in the digital shopping cart may be determined and recorded by the service provider. The data may be stored with the account used to access the platform and generate the abandoned digital shopping cart, or may be stored with user or device identifiers that may be used to recall the data at a later time. Such data may be processed directly by the device and/or application, or may be transmitted to the service provider's system for processing. Such code and associated processes may be implement in multiple different platforms, which may be used by the service provider to record abandonment of processes across multiple platforms (e.g., online merchant websites and/or accessible application data), as well as output and unification of abandoned process data with newly executing processes across these platforms.

The executable software code and processes implemented in the merchant platform (or other online service or resource) may also be used to detect new online interactions by the device and/or account of the user, including new online shopping sessions, digital cart creations, and/or checkout processes for new digital carts occurring after the previously generated and abandoned digital shopping cart. These new interactions may occur with a different online platform, and therefore the previous data that may be stored to the device performing in the new current interactions and/or the first previous platform with which the previously generated cart was created with may not correspond to the second new platform that the device and/or account is currently using. For example, the previous data may be for the previous platform that is different from the current platform and has different items for sale, different code and data processes, and/or different interface displays for checkout processes or digital carts. Moreover, the second platform the user is currently using may not locally store or have access to and be able to retrieve the previous data for the past abandoned shopping cart.

Thus, the service provider may detect the new shopping session on a different platform, digital cart generation, and/or checkout process for a new digital cart through the different platform using the implemented code and associated executable processes. The service provider may detect the new process use, such as the digital cart generation and/or checkout, through user input to the second platform (e.g., the different, currently used platform). The user input may include browsing data (e.g., items), requesting data generation and/or processes execution (e.g., moving of items to a digital shopping cart and generating the shopping cart), and/or process completion requests and input (e.g., a request to check out and complete a transaction to pay for items in a digital shopping cart). The service provider may further use the implemented code and processes to determine new digital cart data for the currently pending and newly generated digital shopping cart on the second platform. The service provider may previously receive, or may use the implemented code and processes in the second platform, to determine platform processes and interface used to display the newly generated digital shopping cart, including interfaces to view and alter the digital shopping cart on the second platform and checkout and process the digital shopping cart in a transaction. Such data may be used to determine data necessary to output additional data on the device when using, viewing, altering, and/or processing the new digital shopping cart on the second platform. This may correspond to website and/or application data specific to the second platform. However, in other embodiments, the first platform and the second platform may be accessed through the same website or application (e.g., one provided by the service provider) and have different checkout processes, where the service provider may determine utilize the same data format, user interfaces, or other information to output the data.

In response to detecting the new and currently executing process with the second platform, the service provider may retrieve the previous processes data that the service provider stored after abandonment and prior to completion. For example, where a new shopping cart is generated on a second platform, and may be viewed and/or requested to be processed in a transaction, the service provider may retrieve one or more previously abandoned digital shopping carts with one or more previously used platforms. The data may be retrieved based on the account used to generate the previously abandoned cart and the currently pending cart, or a user or device identifier used to correlate the data may also be used. The service provider may the utilize the data format, user interface, and/or platform processes data to determine output that may cause data for the previously abandoned cart, such as the items, prices, discounts, item information, total, tax, shipping information, and/or other shopping cart data to be displayed with similar shopping cart data for the currently pending cart. Thus, output or display data for the previously abandoned cart may be determined using data for the previously abandoned cart and the user interface, data format, and/or processes data for the second platform. The output or display data may therefore display the data for the previously abandoned cart with the currently pending cart, for example, in the same webpage, application interface, and/or checkout process for the currently pending cart. The output or display data may include an option to process the previously abandoned cart separately or at the same time as the currently pending cart. For example, the process may allow a user using the computing device outputting the data to process both carts at the same time in a single input or transaction. The output or display data may also allow the user to use the device and application to change the previously abandoned cart, for example, by adding or removing items, applying a discount, changing shipping or billing information, or other process.

In other embodiments, the service provider may instead generate a separate user interface window for the previously abandoned cart that is displayable with or within the interface showing or processing the currently pending cart. The separate user interface window may include a process to have the previously abandoned cart processed with the pending cart, or may allow the previously abandoned cart to be processed in a separate transaction. Once generated, the output or display data for the previously abandoned cart may be output to the user during generation, viewing, and/or processing of the currently pending cart with the second platform, for example, within the same interface or screen and at the same time to allow for unified viewing of both shopping carts. Thus, the data for the abandoned shopping cart on a first platform may be unified with the data for a currently pending shopping for a second and different platform to allow singular and unified viewing of both data sets of the separate digital shopping carts. Additionally, other types of data unification may also be accomplished using the aforementioned processes, for example, by unifying data from another type of previously abandoned digital shopping cart with the currently executing process.

After unification of data output between different data platforms, such as different online merchant and/or marketplaces, the unified data view may allow for dual data processing for the previously abandoned process and the currently pending and executing process. For example, the unified data view may allow for both processes to be completed through a single processing request, such as a single transaction processing request for both the previously abandoned digital shopping cart and the currently pending digital shopping cart. If the service provider receives a processing request for both processes, the service provider may process both processes in two different transactions or events, which may remain hidden from the device so that the device is required to only request a single processing event and views singular processing by the service provider. Thus, two separate transactions may be processed based on a single transaction processing request for both the previously abandoned cart and the currently pending cart. In order to process the previously abandoned cart, the service provider may generate a new digital shopping cart with the first platform for the previously abandoned cart, where the new cart corresponds to a shadow or cloned cart generated using the data for the previously abandoned cart and is pending with the first platform. The service provider may then process this new shadow cart with the first platform using one or more electronic transaction processing services and processes provided by the service provider, and may provide a payment using the account of the user to the first platform.

The service provider may also process the currently pending cart with the second platform using the account of the user using an electronic transaction processing service/process to provide a payment to the second platform. The service provider may generate a transaction history for each processed transaction, and may provide the transaction history to the device in the unified data view or one or more additional interfaces, or may store the histories to the account. However, if the device requests processing of only one of the processes, such as only processing the currently pending cart (or the previously abandoned cart), the service provider may remove data for the other cart that is not requested to be processed, and may process only the requested cart. In this regards, the currently pending cart may be processed by itself, or a shadow or cloned cart of the previously abandoned cart may be generated and processed as described above.

In various embodiments, in order to incentive a user to process or complete checkout of the previously abandoned cart, the service provider may generate an incentive, such as a discount, rebate, savings, reward, loyalty program benefit, or other type of benefit to incentivize the user to process the previously abandoned cart. The data for the incentive may then be generated by the service provider and communicated to the device for output to the user in the unified view within the displayed interface. The output data of the previously abandoned cart may further include a process for automatic redemption of the incentive in the output data, which may be applied to the cart when the device utilizes the output data of the incentive to process one or more transactions. The output data may include a selectable link, interface button or field, or other executable process to redeem the incentive. The incentive may be for one or more of the merchant, the online marketplace, and/or the specific application or application process (e.g., for the items in the digital shopping cart). The incentive may be provided and redeemable only if the user completes the previously abandoned cart at some point or within a certain time period. The incentive may therefore be specific to the previously abandoned cart, including the data in the process (e.g., the items in the cart). The incentive or other output data may also be specific to the device, user, and/or account that abandoned the cart, such as an incentive that is specific tailored to convert the user to finishing the process and purchasing the items.

Thus, the service provider may provide unification of data output between multiple different platforms through leveraging implemented code and associated processes across these different platforms to listen for events, record data of abandoned processes, and generate data output of abandoned processes across different platforms. This allows the service provider to track incomplete processing events and abandoned processes to provide devices and applications with data recall allowing for completion of the processes. Thus, a device may display a singular unified data view that includes data from different platforms in a convenient and easy to view manner. This allows for reduced interface clutter and congestion, while outputting data of incomplete processes. The service provider may further allow for processing of multiple different processes across different platform with reduced processing requirements by the device and reduced input required by the device through the unified data view. This unified view allows for one processing requirement by the device that allows for the service provider to offload device processing and complete the processes through separate transaction. In this manner, device usage and processing requirements may be reduced, and abandonment of application and online service use and processing may be improved through completing such processes. A further advantage is that the user does not need to leave a current platform (through a website or app) and go to a different platform to complete a process or checkout from a previous transaction at the different platform.

FIG. 1A is a block diagram of a networked system 100a suitable for implementing the processes described herein, according to an embodiment. As shown, system 100a may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1A may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100a includes a communication device 110, a first online platform 120, a second online platform 130, and a transaction processor server 140 in communication over a network 160. Communication device 110 may be utilized to access the various features available for communication device 110, which may include processes and/or applications associated first online platform 120, second online platform 130, and/or transaction processor server 140 to engage in an application process that may utilize first online platform 120, second online platform 130, and/or transaction processor server 140. For example, communication device 110 may abandon a digital shopping cart generated using first online platform 120 and/or transaction processor server 140 with the data provided by first online platform 120. Transaction processor server 140 may record data of this abandoned digital shopping cart or other process with first online platform 120. Communication device 110 may later perform some process with second online platform 130, such as generating another digital shopping cart with second online platform 130. Transaction processor server 140 may utilize the data of the abandoned digital shopping cart or process with first online platform 120 to determine output data for communication device 110 that is displayed with the current digital shopping cart with second online platform 130. Transaction processor server 140 may then process a joint transaction based on a single transaction processing request with first online platform 120 and second online platform 130.

Communication device 110, first online platform 120, second online platform 130, and transaction processor server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Communication device 110 may be implemented as a communication device that may utilize appropriate hardware and software configured for wired and/or wireless communication with first online platform 120 and/or transaction processor server 140. For example, in one embodiment, communication device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

Communication device 110 of FIG. 1A contains a device application 112, other applications 114, a database 116, and a communication module 118. Device application 112 and other applications 114 may correspond to executable processes, procedures, and/or applications with associated hardware. In other embodiments, communication device 110 may include additional or different modules having specialized hardware and/or software as required.

Device application 112 may correspond to one or more processes to execute software modules and associated devices of communication device 110 to initiate, engage in, abandon, and/or complete one or more processes with first online platform 120 and/or second online platform 130 including generation, abandonment and/or processing of electronic transactions over a network for one or more items in a digital shopping cart generated using a merchant or marketplace application provided by first online platform 120 or second online platform 130. In this regard, device application 112 may correspond to specialized hardware and/or software utilized by a user of communication device 110 to request access or executing of one or more application processes, which may utilize first online platform 120 and/or second online platform 130. During execution of the process, device application 112 may abandon the process, for example, by quitting from the process or not providing further user input that completes the process. Device application 112 may be closed or quit from execution, and therefore abandon a process that was executing at the time of closure of device application 112. Where the application process corresponds to a shopping, purchase, or other electronic transaction processing process, device application 112 may be utilized with first online platform 120 and/or second online platform 130 to view one or more items for sale, select items of interest for purchase, add those items to a digital shopping cart, and complete electronic transaction processing for the digital shopping cart through providing an account or other payment instrument used to provide payment for the digital shopping cart. Device application 112 may be used to therefore access one or more websites or data for application interfaces of first online platform 120 and/or second online platform 130, display item data and shopping information, and allow a user to generate and/or process an electronic transaction for one or more items. This may require user input and entry and execution of process actions, tasks, or operations, which may be input using one or more input devices of communication device 110 and may correspond to recordable actions.

Therefore, user input during processing of a digital shopping cart with first online platform 120 and/or second online platform 130 may correspond to a request to process the digital shopping cart and complete the process (e.g., by providing further input and/or processing the cart), or quit or abandon processing of the cart so that the items are not purchased in the cart. For example, user input that may be used to abandon a digital shopping cart with first online platform 120 and/or second online platform 130 may correspond to navigating to another user interface, tab, or application, closing of the application through a command or input (e.g., moving a mouse to an interface field or option to close device application 112), entry of a hotkey or shortcut to move to another interface or application or close device application 112, remove items from a digital shopping cart, navigating to another website, or otherwise providing input that is associated with an abandoned process. User input may also be lack of a requested input or action within a certain time period, resulting in abandonment of the processing of the cart.

Device application 112 may utilize one or more user interfaces, such as graphical user interfaces presented using an output display device of communication device 110, to enable the user associated with communication device 110 to utilize processes and data provided by first online platform 120, second online platform 130, and/or transaction processor server 140, including accessing online merchant or marketplace data for first online platform 120 and/or second online platform 130, generating a digital shopping cart for one or more items with first online platform 120 and/or second online platform 130, and complete a transaction to purchase the items in the digital shopping cart with first online platform 120 and/or second online platform 130 or abandon processing of the digital shopping cart with first online platform 120 and/or second online platform 130 through user input. In various embodiments, device application 112 may correspond to a general browser application configured to retrieve, present, and communicate information over the Internet (e.g., utilize resources on the World Wide Web) or a private network. For example, device application 112 may provide a web browser, which may send and receive information over network 160, including retrieving website information (e.g., a website for transaction processor server 140), presenting the website information to the user, and/or communicating information to the website, including payment information for transaction processed through transaction processor server 140. However, in other embodiments, device application 112 may include a dedicated application of first online platform 120, second online platform 130, and/or transaction processor server 140 or other entity (e.g., a marketplace provided a sales platform for first online platform 120 and/or second online platform 130), which may be configured to assist in processing transactions electronically, including transactions for digital shopping cart processing. The interface(s) provided by device application 112 may be utilized to engage in electronic transaction processing, including online purchases for electronic transaction processing processes.

Device application 112 may further be used to output display or other output data in one or more interfaces for a digital shopping cart with first online platform 120 and/or second online platform 130. Where device application 112 and/or an account being used by device application 112 has previously abandoned a shopping cart with a platform, such as first online platform 120, device application 112 may be used to view the abandoned digital shopping cart in an interface based on data received from transaction processor server 140. For example, device application 112 may have previously accessed first online platform 120 and performed some processing and actions to generate a digital shopping cart, but not complete the cart (e.g., complete a checkout) and abandon the cart prior to processing of the cart to purchase the items, which may be detected by transaction processor server 140, as discussed herein. Device application 112 may access data and/or processes provided by second online platform 130, and may generate another digital shopping cart using second online platform 130 for one or more items for sale from second online platform 130. Such data may be communicated to transaction processor server 140 using code and associated processes implemented in second online platform 130, as discussed herein. Device application 112 may receive interface output data for the abandoned digital shopping cart from transaction processor server 140 during use of a process to generate the other digital shopping cart with second online platform 130. Device application 112 may then display both digital shopping carts in a unified view through one or more interfaces, which may display data for the shopping carts with both first online platform 120 and/or second online platform 130.

Device application 112 may then be used to process an electronic transaction for one or more of the digital shopping carts with first online platform 120 and/or second online platform 130. During processing of the shopping cart, device application 112 may provide a single processing request to process both shopping carts, or may request only a single cart with one of first online platform 120 or second online platform 130 be processed. Device application 112 may be utilized to select payment instrument(s) for use in providing payment for a purchase transaction, transfer, or other financial process. As discussed herein, device application 112 may utilize user financial information, such as a credit card, bank account, or other financial account, as a payment instrument when providing payment information. Additionally, device application 112 may utilize a digital wallet stored with an account with a payment provider, such as transaction processor server 140, as the payment instrument, for example, through accessing a digital wallet or account of a user with transaction processor server 140 through entry of authentication credentials and/or by providing a data token that allows for processing using the account.

Device application 112 may utilize a digital token for the payment account, digital wallet, and/or payment instruments by providing the digital token to authenticate the user and/or use the user's payment account, digital wallet, and/or payment instruments, which may be encrypted and/or provided through a secure channel, to a transaction participant to authenticate the an account, digital wallet, and/or payment instruments to transaction processor server 140 and allow for transaction processing and payment using the account, digital wallet, and/or payment instruments. Selection of a payment instrument may occur prior to, at, or after establishment of the digital shopping cart. Device application 112 may also be used to apply an incentive to the purchase, including one generated by transaction processor server 140 after abandoning initial processing of the shopping cart with first online platform 120. Device application 112 may be utilized to view the results of payment, for example, using transaction histories, dispute resolution processes, and other post-transaction process.

In various embodiments, device application 112 may be utilized to create an account used to process the digital shopping cart and/or engage in other transaction processing. In this regard, device application 112 may be used to enter one or more payment instruments or other funding sources for storage in a digital wallet associated with a payment account (e.g., stored and/or serviced by transaction processor server 140), access the digital wallet and/or payment account for use, and engage in transaction processing with another entity. Device application 112 may provide an interface to permit the user to enter input and other data for payment instruments, for example, through an input device (e.g., touch screen with a graphical user interface, keypad/keyboard, mouse, etc.) and/or through a data capture device (e.g., scanner, camera, other optical device, etc.). Such information may be stored with transaction processor server 140 for use with an online digital wallet and/or account for the user, which may be utilized for transaction processing with another entity, such as a merchant associated with first online platform 120.

In various embodiments, information for the account may also be stored to communication device 110 for use in an offline environment. The account accessible through device application 112 may be used to initiate, receive, and/or process/complete transactions using services provided by transaction processor server 140. Once entered, the payment instruments may be communicated to transaction processor server 140 over network 160 by device application 112 for establishment and/or maintenance/update of the account and/or entry into the digital wallet for the user. The user of communication device 110 may also enter benefits to device application 112, which may include incentives that were providing to finish processing an abandoned process of device application 112. The benefits may correspond to one or more of rewards programs, rewards programs membership level, rewards program points, available items in at least one rewards program, cash-back amounts for the at least one rewards program, airline miles, promotional credit, promotional credit rates, promotional discount rate, merchant discounts, merchant discount rates, and merchant coupons. However, in other embodiments, device application 112 may access and utilize a previously established account.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 160, or other types of applications. Other applications 114 may also include email, texting, voice and IM applications that allow a user to send and receive emails, calls, texts, and other notifications through network 160. In various embodiments, other applications 114 may include financial applications, such as banking applications. Other applications 114 may also include other location detection applications, which may be used to determine a location for the user, such as a mapping, compass, and/or GPS application, which can include a specialized GPS receiver that obtains location information for communication device 110 and processes the location information to determine a location of communication device 110 and the user. Other applications may include social networking applications, media viewing, and/or merchant applications. Other applications 114 may include device interface applications and other display modules that may receive input from the user and/or output information to the user. For example, other applications 114 may contain software programs, executable by a processor, including a graphical user interface (GUI) configured to provide an interface to the user. Other applications 114 may therefore use devices of communication device 110, such as display devices capable of displaying information to users and other output devices, including speakers.

Communication device 110 may further include database 116 stored to a transitory and/or non-transitory memory of communication device 110, which may store various applications and data and be utilized during execution of various modules of communication device 110. Database 116 may include, for example, identifiers such as operating system registry entries, cookies associated with device application 112 and/or other applications 114, identifiers associated with hardware of communication device 110, or other appropriate identifiers, such as identifiers used for payment/user/device authentication or identification, which may be communicated as identifying communication device 110 to transaction processor server 140. Database 116 may include data generated during use of device application 112 and execution of one or more processes, including data generated through creation of one or more digital shopping carts with first online platform 120 and/or second online platform 130 and user input for such generation, abandonment, and/or processing. Moreover, received output data for an interface that provides a unified view and transaction processing for an abandoned shopping cart with first online platform 120 and a pending shopping cart with second online platform 130 may be stored to database 116.

Communication device 110 includes at least one communication module 118 adapted to communicate with first online platform 120, second online platform 130, and/or transaction processor server 140. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices using short range communications, such as Bluetooth Low Energy, LTE Direct, WiFi, radio frequency, infrared, Bluetooth, and near field communications.

First online platform 120 may be implemented as a device, server, and/or cloud computing service or resource that may utilize appropriate hardware and software configured for wired and/or wireless communication with communication device 110, second online platform 130, and/or transaction processor server 140. First online platform 120 may utilize processes, hardware, and network communications to provide an online service and resource to allow users to access data, process the data, and/or communicate data to first online platform 120 for process. In one embodiment first online platform 120 may correspond to an online merchant or marketplace that provides items for sale through accessible data for the items and digital shopping carts that may be processed through transaction processor server 140. Thus, first online platform 120 may provide and implement code and associated processes provided by transaction processor server 140.

First online platform 120 of FIG. 1A contains a first platform application 122, other applications 124, a database 126, and a network interface component 128. First platform application 122 and other applications 124 may correspond to executable processes, procedures, and/or applications with associated hardware. In other embodiments, first online platform 120 may include additional or different modules having specialized hardware and/or software as required.

First platform application 122 may correspond to one or more processes to execute modules and associated specialized hardware of first online platform 120 that provide online sales, checkout, and payment processes for a transaction to purchase one or more items for sale from the user, such as a merchant or seller, corresponding to first online platform 120, including providing data for items available from a merchant on an online marketplace or accessible through a website or dedicated application. In this regard, first platform application 122 may correspond to specialized hardware and/or software of first online platform 120 to provide a convenient interface to permit a merchant to enter, view, and/or edit items and/or services for purchase by the user associated with communication device 110. For example, first platform application 122 may be implemented as an application having a user interface enabling the merchant to enter item information and place one or more items for sale through data accessible using device application 112.

In certain embodiments, first platform application 122 may correspond more generally to a web browser application configured to view and provide information available over the Internet or access a website corresponding to the merchant and/or an online marketplace utilized by the merchant to provide item data for items for sale and post data for device application 112 to retrieve and utilize to process an electronic transaction for one or more items. Data provided by first platform application 122 may be utilized to generate a digital shopping cart by device application 112, where the digital shopping cart may be processed and/or abandoned by user input provided by device application 112. First platform application 122 may also be used to process a transaction for a pending digital shopping cart. However, where the shopping cart has been abandoned, transaction processor server 140 may utilize data from online merchant application 112 to store data for an abandoned digital shopping cart after the cart has been abandoned, as well as generate a new digital shopping cart, such as a cloned or shadow shopping cart, using the data, which may be generated without user input to device application 112 by transaction processor server 140. Additionally, where a shopping cart is generated and transaction processor server 140 determines that past abandoned shopping cart data is to be output with the pending shopping cart, first platform application 122 may be used to access data formats, user interfaces, and/or processes so that data for the abandoned shopping cart may be output with data for the pending shopping cart with first platform application 122.

Once a digital shopping cart is generated and a payment amount is determined for a transaction for items to be purchased using device application 112, first platform application 122 may request payment from the user for transaction processing of a digital shopping cart including the items. Payment may be provided through a token for an account associated with communication device 110. The token may be communicated to first online platform 120, which may be used with the transaction and transaction information for processing. In other embodiments, other data may be provided for transaction processing, including financial information and/or authentication information necessary for use an account for transaction processing. Transaction processor server 150 may process the transaction with the provided token, which may include incentives provided by transaction processor server 140 for completing an abandoned digital shopping cart.

First platform application 122 may then receive the results of the transaction processing, and complete the transaction with the respective user, for example, by providing (e.g., shipping) the items for the transaction or declining the transaction where the user is not authenticated or the transaction is not authorized (e.g., insufficient funds, rejection of the transaction based on risk analysis). A transaction history may then be generated by first platform application 122. Moreover, first platform application 122 may implement code, software, or executable processes provided by transaction processor server 140 to allow for listening of events creating digital shopping carts, abandonment of such carts, output of data for other digital shopping carts previously abandoned, determination of platform data necessary to output data for abandoned shopping carts, and/or transaction processing of digital shopping carts.

In various embodiments, first online platform 120 includes other applications 124 as may be desired in particular embodiments to provide features to first online platform 120. For example, other applications 124 may include security applications for implementing client-side security features, programmatic client applications for interfacing with appropriate application programming interfaces (APIs) over network 160, or other types of applications. Other applications 124 may also include email, texting, voice and IM applications that allow a user to send and receive emails, calls, texts, and other notifications through network 160. In various embodiments, other applications 124 may include financial applications, such as banking applications. Other applications 124 may also include other location detection applications, which may be used to determine a location for the user, such as a mapping, compass, and/or GPS application, which can include a specialized GPS receiver that obtains location information for first online platform 120 and processes the location information to determine a location of first online platform 120 and the user. Other applications may include social networking applications, media viewing, and/or merchant applications. Other applications 124 may include device interface applications and other display modules that may receive input from the user and/or output information to the user. For example, other applications 124 may contain software programs, executable by a processor, including a graphical user interface (GUI) configured to provide an interface to the user. Other applications 124 may therefore use devices of first online platform 120, such as display devices capable of displaying information to users and other output devices, including speakers.

First online platform 120 may further include database 126 stored to a transitory and/or non-transitory memory of first online platform 120, which may store various applications and data and be utilized during execution of various modules of first online platform 120. Thus, database 126 may include, for example, identifiers such as operating system registry entries, cookies associated with first platform application 122 and/or other applications 124, identifiers associated with hardware of first online platform 120, or other appropriate identifiers, such as identifiers used for payment/user/device authentication or identification. In various embodiments, database 126 may information for items for sale, such as item data necessary to generate a transaction to purchase one or more of the items and/or add the items to a digital shopping cart for processing. Database 126 may also store data for pending and/or abandoned digital shopping carts, and may include incentives available for processing pending and/or abandoned carts. Additionally, output data and/or platform data necessary to output other digital shopping carts previously abandoned with another platform, such as second online platform 130, may be stored to database 126.

First online platform 120 includes at least one network interface component 128 adapted to communicate with communication device 110, second online platform 130, and/or transaction processor server 140. In various embodiments, network interface component 128 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Network interface component 128 may communicate directly with nearby devices (e.g., first online platform 120) using short range communications, such as Bluetooth Low Energy, LTE Direct, WiFi, radio frequency, infrared, Bluetooth, and near field communications.

Second online platform 130 may be implemented as a device, server, and/or cloud computing service or resource that may utilize appropriate hardware and software configured for wired and/or wireless communication with communication device 110, first online platform 120, and/or transaction processor server 140. Second online platform 130 may utilize processes, hardware, and network communications to provide an online service and resource to allow users to access data, process the data, and/or communicate data to second online platform 130 for process. In one embodiment second online platform 130 may correspond to an online merchant or marketplace that provides items for sale through accessible data for the items and digital shopping carts that may be processed through transaction processor server 140. Thus, second online platform 130 may provide and implement code and associated processes provided by transaction processor server 140.

Second online platform 130 of FIG. 1A contains a second platform application 132, other applications 134, a database 136, and a network interface component 138. Second platform application 132 and other applications 134 may correspond to executable processes, procedures, and/or applications with associated hardware. In other embodiments, second online platform 130 may include additional or different modules having specialized hardware and/or software as required.

Second platform application 132 may correspond to one or more processes to execute modules and associated specialized hardware of second online platform 130 that provide online sales, checkout, and payment processes for a transaction to purchase one or more items for sale from the user, such as a merchant or seller, corresponding to second online platform 130, including providing data for items available from a merchant on an online marketplace or accessible through a website or dedicated application. In this regard, second platform application 132 may correspond to specialized hardware and/or software of second online platform 130 to provide a convenient interface to permit a merchant to enter, view, and/or edit items and/or services for purchase by the user associated with communication device 110. For example, second platform application 132 may be implemented as an application having a user interface enabling the merchant to enter item information and place one or more items for sale through data accessible using device application 112.

In certain embodiments, second platform application 132 may correspond more generally to a web browser application configured to view and provide information available over the Internet or access a website corresponding to the merchant and/or an online marketplace utilized by the merchant to provide item data for items for sale and post data for device application 112 to retrieve and utilize to process an electronic transaction for one or more items. Thus, the data provided by second platform application 132 may be utilized to generate a digital shopping cart by device application 112, where the digital shopping cart may be processed and/or abandoned by user input provided by device application 112. Second platform application 132 may also be used to process a transaction for a pending digital shopping cart. However, where the shopping cart has been abandoned, transaction processor server 140 may utilize data from online merchant application 112 to store data for an abandoned digital shopping cart after the cart has been abandoned, as well as generate a new digital shopping cart, such as a cloned or shadow shopping cart, using the data, which may be generated without user input to device application 112 by transaction processor server 140. Additionally, where a shopping cart is generated and transaction processor server 140 determines that past abandoned shopping cart data is to be output with the pending shopping cart, second platform application 132 may be used to access data formats, user interfaces, and/or processes so that data for the abandoned shopping cart may be output with data for the pending shopping cart with second platform application 132.

Once a digital shopping cart is generated and a payment amount is determined for a transaction for items to be purchased using device application 112, second platform application 132 may request payment from the user for transaction processing of a digital shopping cart including the items. Payment may be provided through a token for an account associated with communication device 110. The token may be communicated to second online platform 130, which may be used with the transaction and transaction information for processing. In other embodiments, other data may be provided for transaction processing, including financial information and/or authentication information necessary for use an account for transaction processing. Transaction processor server 150 may process the transaction with the provided token, which may include incentives provided by transaction processor server 140 for completing an abandoned digital shopping cart.

Second platform application 132 may then receive the results of the transaction processing, and complete the transaction with the respective user, for example, by providing (e.g., shipping) the items for the transaction or declining the transaction where the user is not authenticated or the transaction is not authorized (e.g., insufficient funds, rejection of the transaction based on risk analysis). A transaction history may then be generated by second platform application 132. Moreover, second platform application 132 may implement code, software, or executable processes provided by transaction processor server 140 to allow for listening of events creating digital shopping carts, abandonment of such carts, output of data for other digital shopping carts previously abandoned, determination of platform data necessary to output data for abandoned shopping carts, and/or transaction processing of digital shopping carts.

In various embodiments, second online platform 130 includes other applications 134 as may be desired in particular embodiments to provide features to second online platform 130. For example, other applications 134 may include security applications for implementing client-side security features, programmatic client applications for interfacing with appropriate application programming interfaces (APIs) over network 160, or other types of applications. Other applications 134 may also include email, texting, voice and IM applications that allow a user to send and receive emails, calls, texts, and other notifications through network 160. In various embodiments, other applications 134 may include financial applications, such as banking applications. Other applications 134 may also include other location detection applications, which may be used to determine a location for the user, such as a mapping, compass, and/or GPS application, which can include a specialized GPS receiver that obtains location information for second online platform 130 and processes the location information to determine a location of second online platform 130 and the user. Other applications may include social networking applications, media viewing, and/or merchant applications. Other applications 134 may include device interface applications and other display modules that may receive input from the user and/or output information to the user. For example, other applications 134 may contain software programs, executable by a processor, including a graphical user interface (GUI) configured to provide an interface to the user. Other applications 134 may therefore use devices of second online platform 130, such as display devices capable of displaying information to users and other output devices, including speakers.

Second online platform 130 may further include database 136 stored to a transitory and/or non-transitory memory of second online platform 130, which may store various applications and data and be utilized during execution of various modules of second online platform 130. Thus, database 136 may include, for example, identifiers such as operating system registry entries, cookies associated with second platform application 132 and/or other applications 134, identifiers associated with hardware of second online platform 130, or other appropriate identifiers, such as identifiers used for payment/user/device authentication or identification. In various embodiments, database 136 may information for items for sale, such as item data necessary to generate a transaction to purchase one or more of the items and/or add the items to a digital shopping cart for processing. Database 136 may also store data for pending and/or abandoned digital shopping carts, and may include incentives available for processing pending and/or abandoned carts. Additionally, output data and/or platform data necessary to output other digital shopping carts previously abandoned with another platform, such as first online platform 120, may be stored to database 136.

Second online platform 130 includes at least one network interface component 138 adapted to communicate with communication device 110, first online platform 120, and/or transaction processor server 140. In various embodiments, network interface component 138 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Network interface component 138 may communicate directly with nearby devices (e.g., second online platform 130) using short range communications, such as Bluetooth Low Energy, LTE Direct, WiFi, radio frequency, infrared, Bluetooth, and near field communications.

Transaction processor server 140 may be maintained, for example, by an online service provider, which may provide transaction processing services on behalf of users and/or merchants including generation and processing of digital shopping carts. In this regard, transaction processor server 140 includes one or more processing applications which may be configured to interact with communication device 110, first online platform 120, and/or another device/server to facilitate transaction processing. In one example, transaction processor server 140 may be provided by PAYPAL®, Inc. of San Jose, CA, USA. However, in other embodiments, transaction processor server 140 may be maintained by or include another type of service provider, which may provide connection services to a plurality of users.

Transaction processor server 140 of FIG. 1A includes a cross-platform data unification application 150, a transaction processing application 142, other applications 144, a database 146, and a network interface component 148. Cross-platform data unification application 150, transaction processing application 142, and other applications 144 may correspond to executable processes, procedures, and/or applications with associated hardware. In other embodiments, transaction processor server 140 may include additional or different modules having specialized hardware and/or software as required.

Cross-platform data unification application 150 may correspond to one or more processes to execute software modules and associated specialized hardware of transaction processor server 140 to determine whether communication device 110 is processing a pending digital shopping cart or otherwise performed some interaction with first online platform 120 and/or second online platform 130 to generate the digital shopping cart, and if so, output data stored to database 146 for a past abandoned digital shopping cart from first online platform 120 and/or second online platform 130 with the pending cart. In this regard, cross-platform data unification application 150 may correspond to specialized hardware and/or software to receive information of a previously abandoned digital shopping cart with one of first online platform 120 or second online platform 130. Cross-platform data unification application 150 may execute during one or more processes to detect whether actions, tasks, or operations performed with a cart causes abandonment of the cart with first online platform 120 and/or second online platform 130 so that the cart is not processed in a transaction.

For example, communication device 110 may engage in a process, such as an online shopping session using data and/or online resources provided by first online platform 120 over network 160. Communication device 110 may generate a digital shopping cart having one or more items. After generation of the cart and prior to checkout and electronic transaction processing to provide a payment for the items in the cart, user input or another executable action may be provided. The action may cause abandonment of the process, such as by quitting the process, application, or otherwise cause communication device 110 to end the process. If the action causes abandonment of the process, cross-platform data unification application 150 may determine data for the current state and pending data for the process (e.g., the digital shopping cart for the shopping session), and may store the data to database 146 as an abandoned cart that later will require completion.

Cross-platform data unification application 150 may listen or monitor for further shopping cart generation and/or checkout events. If an event is detected for a currently pending shopping cart with first online platform 120 and/or second online platform 130, cross-platform data unification application 150 may generate output data for a previously abandoned shopping cart with first online platform 120 and/or second online platform 130 that may be output on communication device 110 to complete the abandoned shopping cart. One or more of the processes discussed herein of cross-platform data unification application 150 may be implemented in first online platform 120 and/or second online platform 130 utilize various code, software packages, or other processes that may be provided with the online platform accessible through a web browser or dedicated application for first online platform 120 and/or second online platform 130. Thus, cross-platform data unification application 150 may provide a software package, code snippet, implementable process, and/or software development kit to implement the processes described herein for abandonment detection and abandoned process data output in a website and/or application provided by first online platform 120 and/or second online platform 130.

If an event corresponding to a navigation, interaction, generation, and/or checkout process for a digital shopping cart is detected through the code and processes implemented in first online platform 120 and/or second online platform 130, cross-platform data unification application 150 may utilize an identifier of communication device 110, an account used by communication device 110, and/or another identifier used during the current cart interaction to retrieve data for one or more previously abandoned digital shopping carts with first online platform 120 and/or second online platform 130 associated with the identifier. The cart data may include items previously included in the shopping cart, a total, item identifiers for retrieval of item data and/or descriptions, or other digital shopping cart data. Cross-platform data unification application 150 may then utilize the data of the previously abandoned cart to determine output or display data for the previously abandoned cart within the interface provided by one of first online platform 120 or second online platform 130 that includes the currently pending cart with the one of first online platform 120 or second online platform 130.

In various embodiments, more than one abandoned cart may be used and output data generated for multiple abandoned carts. In order to do this, cross-platform data unification application 150 may retrieve data formats, interface information, and/or other platform data with the abandoned cart data to generate the output data. The cart data from the abandoned cart from one of first online platform 120 or second online platform 130 may therefore be adjusted, configured, or modified to be displayed in an interface output and displayed by the other one of first online platform 120 or second online platform 130 having the currently pending cart. For example, where a digital shopping cart is abandoned in a previous shopping session with first online platform 120, cross-platform data unification application 150 may detect a current shopping session with second online platform 130, and may retrieve cart data for the abandoned cart with first online platform 120. Cross-platform data unification application 150 may then configure the retrieved cart data for output in an interface of second online platform 130 using the data formats, interfaces, and other platform configuration and output data of second online platform 130. However, where the interface for the checkout process is provided by transaction processor server 140, such as in a dedicated application or website of transaction processor server 140, the output data may be configured using the checkout interface format and interfaces provided by transaction processor server 140 (e.g., provided in an interface window generated and output by transaction processor server 140).

Once generated, cross-platform data unification application 150 may output the data for the previously abandoned shopping cart with one of first online platform 120 or second online platform 130 in the interface displayed by the other one of first online platform 120 or second online platform 130 having a currently pending cart made in a present shopping session. In the example described above, second online platform 130 may generate and output an interface for a pending shopping cart on communication device 110, where cross-platform data unification application 150 may then cause output data for the shopping cart abandoned from a previous shopping session with first online platform 120 in the same interface to provide a unified data view. Cross-platform data unification application 150 may further provide an interface option or executable process to process both the previously abandoned cart and the currently pending cart in a single transaction with both of first online platform 120 and second online platform 130. Thus, communication device 110 may only be required to perform and/or enter data for a single transaction request to process both transactions.

The interface may also allow for singular transaction processing of a single digital cart, which may cause removal of the other digital shopping cart from the interface and transaction processing by transaction processing application 142. Where cross-platform data unification application 150 receives a joint transaction processing request for both digital shopping carts, cross-platform data unification application 150 may request the currently pending digital shopping cart to be processed with the one of first online platform 120 or second online platform 130 generating the cart by transaction processing application 142. In order to process the second transaction for the abandoned shopping cart with the other one of first online platform 120 or second online platform 130, cross-platform data unification application 150 may generate a shadow, cloned, or new version of the previously abandoned cart having the same or similar data (e.g., the same items for the same price or the currently pending price if it has changed from the previous price at the time of abandonment). This shadow cart may be generated without user input to communication device 110 and may be processed through the single transaction processing request. Cross-platform data unification application 150 may then request transaction processing of the shadow cart by transaction processing application 142 with the other one of first online platform 120 or second online platform 130 having the abandoned shopping cart data.

Transaction processing application 142 may correspond to one or more processes to execute software modules and associated specialized hardware of transaction processor server 140 to provide payment and transaction processing services to merchants and users, for example though an account and/or payment instruments of the user to an account of the merchant, where the service may include electronic transaction processing for one or more digital shopping carts, including a previously abandoned digital shopping cart with one of first online platform 120 or second online platform 130 during a shopping session with the other one of first online platform 120 or second online platform 130. In this regard, transaction processing application 142 may correspond to specialized hardware and/or software to provide transaction processing and payment services through accounts, including digital wallets storing payment instruments. The services may allow for a payment through a payment instrument, including a credit/debit card, banking account, payment account with transaction processor server 140, and/or other funding instrument. The payment may be used to provide a payment for a digital shopping cart. In order to establish an account to send and receive payments, transaction processing application 142 may receive information requesting establishment of the account. The information may include user personal, business, and/or financial information, or other information for an entity establishing the account (e.g., personal user, merchant, charity, etc.). Additionally the information may include a login, account name, password, PIN, or other account creation information. The entity establishing the account may provide a name, address, social security number, or other personal or business information necessary to establish the account and/or effectuate payments through the account. Transaction processing application 142 may further allow the entity to service and maintain the payment account, for example, by adding and removing funding instruments.

Transaction processing application 142 may be used to provide a payment for a digital shopping cart, including payment for a previously abandoned cart that has been recreated and submitted for processing as a shadow or cloned digital shopping cart by cross-platform data unification application 150. In various embodiments, transaction processing may be completed with a provided incentive to process the shopping cart. Transaction processing application 142 may process the payment for the digital shopping cart using the account of the entity requesting transaction processing, as well as any provided incentive. Where multiple transactions have been detected for two or more digital shopping carts by disparate first online platform 120 and second online platform 130, transaction processing application 142 may process multiple transactions based on a single transaction processing request. Such transactions may be processed without further user input to process separate transactions, where the user may only be required to submit a single request and may view the results of transaction processing as a single transaction. Transaction processing application 142 may debit an account of the user and provide the payment to an account of the merchant or platform, where multiple debits and payments may be performed for multiple transaction processing when required. Transaction processing application 142 may also be used to provide transaction histories for processed transactions, which may include a single transaction history for multiple transactions or multiple transactions histories, such as one for each transaction where necessary.

In various embodiments, transaction processor server 140 includes other applications 144 as may be desired in particular embodiments to provide features to transaction processor server 140. For example, other applications 144 may include security applications for implementing server-side security features, programmatic client applications for interfacing with appropriate application programming interfaces (APIs) over network 160, or other types of applications. Other applications 144 may contain software programs, executable by a processor, including a graphical user interface (GUI), configured to provide an interface to the user when accessing transaction processor server 140, where the user or other users may interact with the GUI to more easily view and communicate information. In various embodiments, other applications 144 may include connection and/or communication applications, which may be utilized to communicate information to over network 160.

Additionally, transaction processor server 140 includes database 146. As previously discussed, the user and/or the merchant may establish one or more digital wallets and/or accounts with transaction processor server 140. Digital wallets and/or accounts in database 146 may include user information, such as name, address, birthdate, payment instruments/funding sources, additional user financial information, user preferences, and/or other desired user data. Users may link to their respective digital wallets and/or payment accounts through an account, user, merchant, and/or device identifier. Thus, when an identifier is transmitted to transaction processor server 140, e.g., from communication device 110, one or more digital wallets and/or payment accounts belonging to the users may be found. Database 146 may also store data of abandoned processes with one or more of first online platform 120 and/or second online platform 130. Additionally, currently executing and/or recently abandoned process data may be stored to database 146 with data necessary to output the processes, such as digital shopping carts, in a single view or interface for unified viewing.

In various embodiments, transaction processor server 140 includes at least one network interface component 148 adapted to communicate communication device 110, first online platform 120, and/or second online platform 130 over network 160. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 1B:
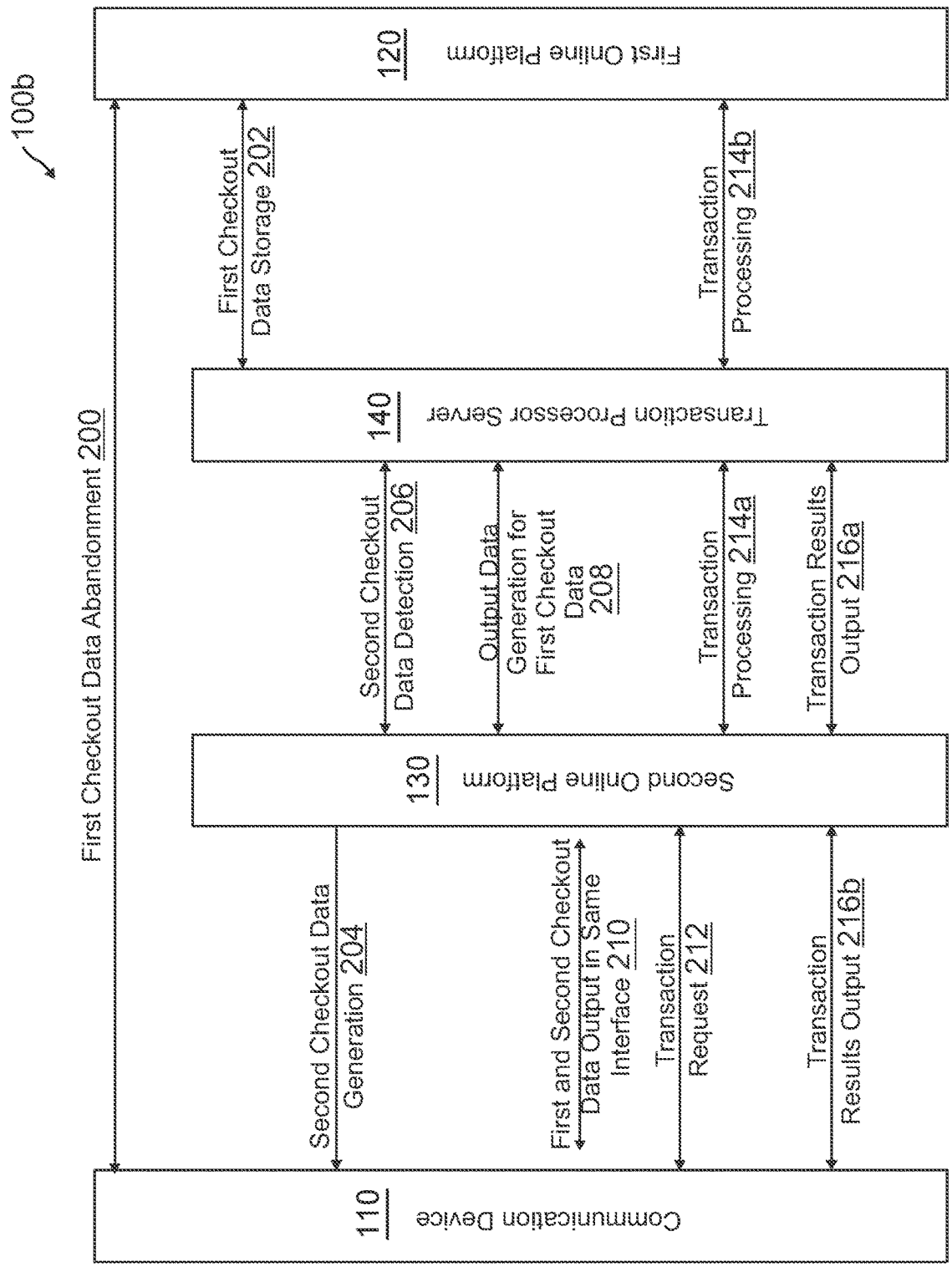
FIG. 1B is a block diagram of a networked system having the computing resources of FIG. 1A communicating for cross-platform tracking of user generated data for unified data output, according to an embodiment.

FIG. 1B is a block diagram of a networked system having the computing resources of FIG. 1A communicating for cross-platform tracking of user generated data for unified data output, according to an embodiment. System 100b includes communication device 110, first platform 120, second platform 130, and transaction processor server 140 discussed in reference to system 100a of FIG. 1A.

Communication device 110 in system 100b may initially interact with first online platform 120 during a previous online session to generate and abandon first checkout data during a process 200 that causes first checkout data abandonment. Process 200 may correspond to the online session that adds items to a digital shopping cart, but abandons the digital shopping cart so that the digital shopping cart is never processes in a transaction. In response to first checkout data abandonment process 200, first online platform 120 may then communicate the first checkout data to transaction processor server 140 during process 202 for first checkout data storage, which may store the first checkout data to transaction processor server 140 for later use and processing. First checkout data storage process 202 may be performed through a code snippet or process provided by transaction processor server 140 in first online platform 120 that listens for the cart generation, detects the abandonment, and stores the cart data.

Communication device 110 subsequently performs second checkout data generation during process 204 with second online platform 130, which causes generation of second checkout data for one or more items in another digital shopping cart. Second online platform 130 include a code snippet or process that detects this online interaction by communication device 110 with second online platform 130, and allows for transaction processor server 140 to perform process 206 for second checkout data detection based on listening to the events occurring on second online platform 130 by communication device 110 through the code snippet. Transaction processor server 140 may then decal the first checkout data from storage, and may generate output data that is specific to a checkout interface of second online platform 130. Thus, second online platform 130 and transaction processor server 140 may interact to perform process 208 for output data generation for first checkout data. Second online platform 130 may then use this output data during process 210 to provide first and second checkout data output in a same interface to communication device 110.

In response to process 210, communication device may receive and process input for a transaction request at process 212. The transaction request may be for a single one of first checkout data or second checkout data, or for both. Second online platform 130 may receive the transaction request during process 212, which may include a transaction request for first online platform 120 that is received through the interface of second online platform 130. Second online platform 130 and transaction processor server 140 may interact during transaction processing process 214a to process a transaction request for second online platform 130, for example, for the second checkout data. Additionally, process 214a may provide a transaction request for first online platform 120 to transaction processor server 140. Transaction processor server 140 may generate a shadow cart or checkout based on the first checkout data during process 214b, and may process the shadow checkout data with first online platform 120. Based on the results of transaction processing, transaction processor server 140 may execute process 216a with second online platform 130 to output the results with both first online platform 120 and second online platform 130. Second online platform may receive both results during process 216a, and may provide the transaction results out to communication device 110 during process 216b within an interface of second online platform 130.

FIG. 2A is an exemplary user interface of a device displaying a current checkout interface for a current shopping cart that further includes display data for a past shopping cart for completion in a unified process, according to an embodiment. Environment 200a includes an application interface 1000 output by a computing device, such as communication device 110 having the described features, processes, and components discussed in reference to system 100a of FIG. 1A. In this regard, a user viewing application interface 1000 in environment 200a may view displayed data from processes executed by one or more of the applications discussed in reference to communication device 110.

In this regard, application interface 1000 may display data during an executing process of an application, such as application output data that may be displayed during a session of use of the application. For example, application interface 1000 may display a navigation window of a browser application, which may display an accessed website having a pending digital shopping cart 1002 currently being generated and processed with a merchant using a service provider 1001. In other embodiments, application interface 1000 may be displayed or output in a dedicated application of the merchant or service provider 1001. Application interface 1000 may further display data for pending digital shopping cart 1002, including an account name 1004 for an account being used to generate and process pending digital shopping cart 1004, shipping information 1006 entered and/or associated with account name 1004 for pending digital shopping cart 1002, a payment instrument 1008 for account name 1004 and pending digital shopping cart 1002, and a transaction processing request option 1010 that may initiate transaction processing for pending digital shopping cart 1002 and any additional digital shopping carts added to the transaction processing request for transaction processing request option 1010. Account name 1004, shipping information 1008, and payment instrument 1008 may all be used to process the transaction for pending digital shopping cart 1002 electronically with service provider 1001 on selection of transaction processing request option 1010. Further, account name 1004, shipping information 1008, and payment instrument 1008 may also be used to process any additional transactions, including previously abandoned shopping carts, that may be added to transaction processing request option 1010 in application interface 1000.

In order to provide a unified data view of data from additional merchant platforms, application interface 1000 may display data that has been configured to be displayed in application interface 1000 with pending digital shopping cart 1002. This data may include output data for a previously abandoned digital shopping cart with another merchant platform. Service provider 1001 may configure the data for the previously abandoned digital shopping cart specifically for application interface 1000 so that the data from the other platform may be output in application interface 1000 for a unified data view of the disparate platform's data. Thus, application interface 1000 is shown with output data 1012 for the previously abandoned digital shopping cart with the other merchant platform. Similar to pending digital shopping cart 1002, output data 1012 includes data for the abandoned digital shopping cart with the other merchant platform, including shipping information 1014, cart items 1016, a cart total 1018, and an add to transaction processing request option 1020. Various portions of output data 1012 may be supplied by pending digital shopping cart 1002, or may be added from the account for account name 1004. Moreover, cart items 1016 and cart total 1018 may be determined and generated for output in application interface 1000 using stored data for the abandoned digital shopping cart by service provider 1001, as well as data available with the other merchant platform, such as sales data, item data, etc.

If add to transaction processing request option 1020 is selected, output data 1012 may be added to pending digital shopping cart 1002 and/or transaction processing request option 1010 for joint transaction processing. Service provider 1001 may then process both transactions by generating a shadow, mimicked, or cloned cart of the abandoned digital shopping cart using output data 1012 (e.g., shipping information 1014, cart items 1016, and/or cart total 1018), as well as any other stored data and/or account information for account name 1004 (e.g., payment instrument 1008), to generate a same or similar shopping cart with the other merchant platform and process the generated cart. Service provider 1001 may also process pending digital shopping cart 1002 at the same time in another transaction.

Figure 2B:
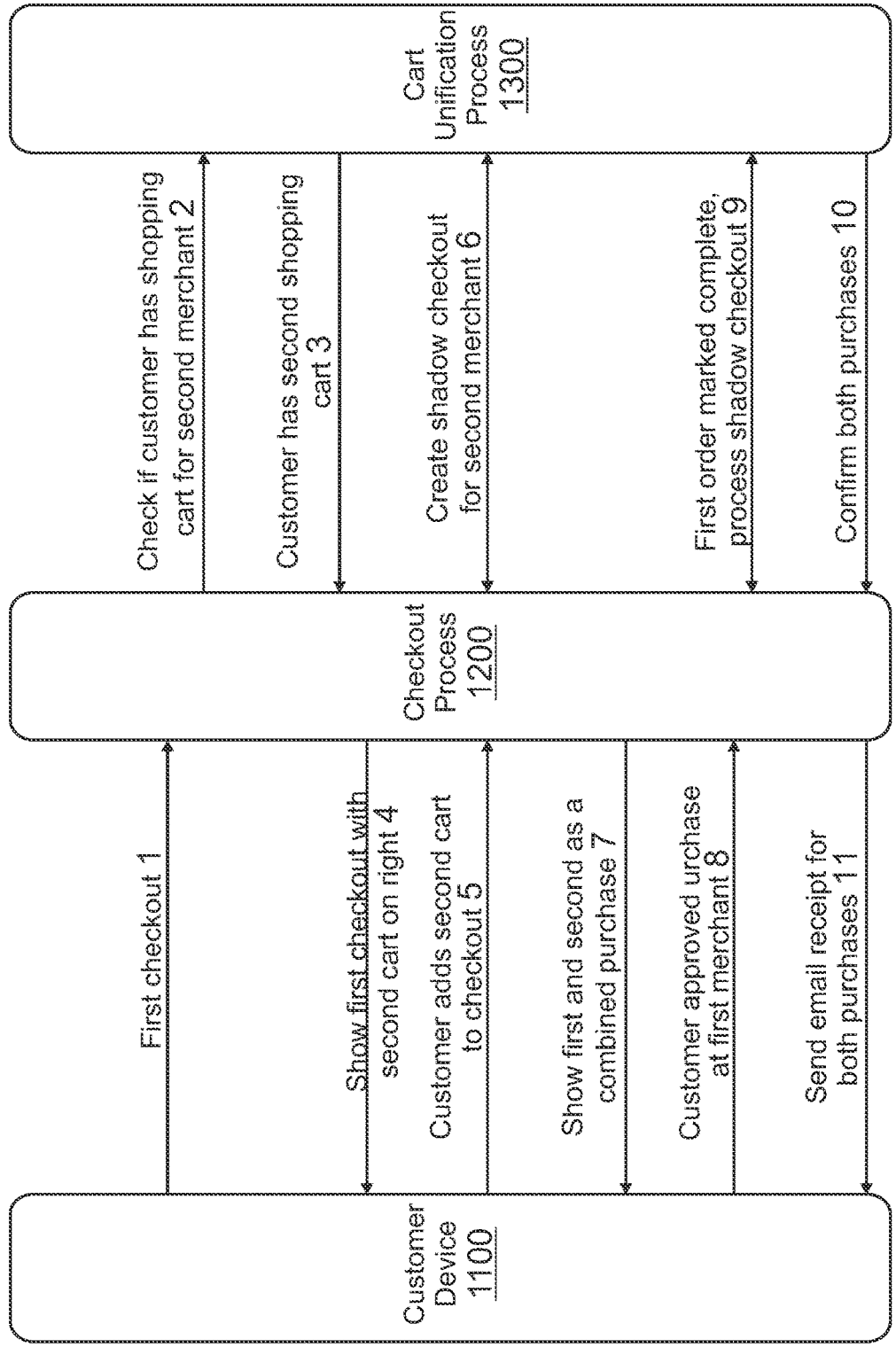
FIG. 2B is an exemplary system environment showing system interactions between a device and a service provider to output present and past data in a unified user interface, according to an embodiment.

FIG. 2B is an exemplary system environment showing system interactions between a device and a service provider to output present and past data in a unified user interface, according to an embodiment. Environment 200b includes a customer device 1100, which may correspond generally to a computing device such as communication device 110 having the described features, processes, and components discussed in reference to system 100a of FIG. 1A. In this regard, customer device 1100a may utilize one or more processes executed by one or more of the applications discussed in reference to communication device 110 in system 100. Environment 200b further includes a checkout process 1200 corresponding to the processes executed by one or more of the applications discussed in reference to transaction processor server 140 in system 100, such as transaction processing application 142 and/or cross-platform data unification application 150. Checkout process 1200 may further utilize, store, and access data in a database 1300, which may include various data discussed in reference to database 146 of system 100.

Customer device 1100a may interface with checkout process 1200 using one or more applications during a session of use of the application, such as a shopping session using an application that interacts with a merchant platform. In this regard, customer device 1100a may generate a first checkout for a first shopping cart at step 1, which may be generated with a merchant platform and utilize a checkout process 1200 provided by a service provider, such as transaction processor server 140 in system 100a and/or service provider 1001 in environment 200b. The service provider may therefore provide a checkout process 1200 that may be implemented in one or more merchant platforms, for example, through software development kits, code, processes, and/or other framework that may be used by one or more merchant platforms to provide electronic transaction processing services for digital shopping cart generation and processing. Once the first checkout data for the first shopping cart is received at step 1, checkout process 1200 may then interact with database 1300 to check if the customer using customer device 1100a has a shopping cart with a second merchant platform at step 2. If a second shopping cart (e.g., an abandoned shopping cart) is located in database 1300, checkout process 1200 may retrieve the data for the second shopping cart with the second merchant at step 3.

Using the data for the second shopping cart received at step 3, checkout process 1200 may utilize and configure the data for output with the first checkout having the first shopping cart as the second shopping cart shown on the right (or left, up, down, or otherwise within the interface with the first shopping cart) at step 4. In various embodiments, the data may be required to be configured for the checkout process on the other merchant platform. However, where checkout process 1200 may be implemented in multiple merchant websites using the same or similar code, interfaces, and/or processes, then checkout process 1200 may configure the data using the provided information for the implementation and/or use of checkout process 1200 in the respective platform. If the customer utilizing customer device 1100a wishes to purchase the items in both carts, customer device 1100a may add the second cart to the first checkout having the first cart at step 5. Checkout process 1200 may respond by generating a shadow checkout and shopping cart for the second merchant platform with data in database 1300 at step 6, where the shadow checkout automatically recreates and processes the previously abandoned second cart with the second merchant. Checkout process may then display the first and second checkouts and carts as a combined purchase at step 7, which may be output to customer device 1100.

If the customer approves the combined purchase at step 8, customer device 1100a may approve the purchase through the interface of the first merchant displaying the unified data view of the first and second checkout and carts. Checkout process 1200 may receive this approval and transaction processing request, and may process and mark both orders as complete at step 9. Using the data in database 1300, checkout process 1200 may confirm both purchases at step 10, and may send an email or other transaction history to customer device 1100a at step 11.

Figure 3:
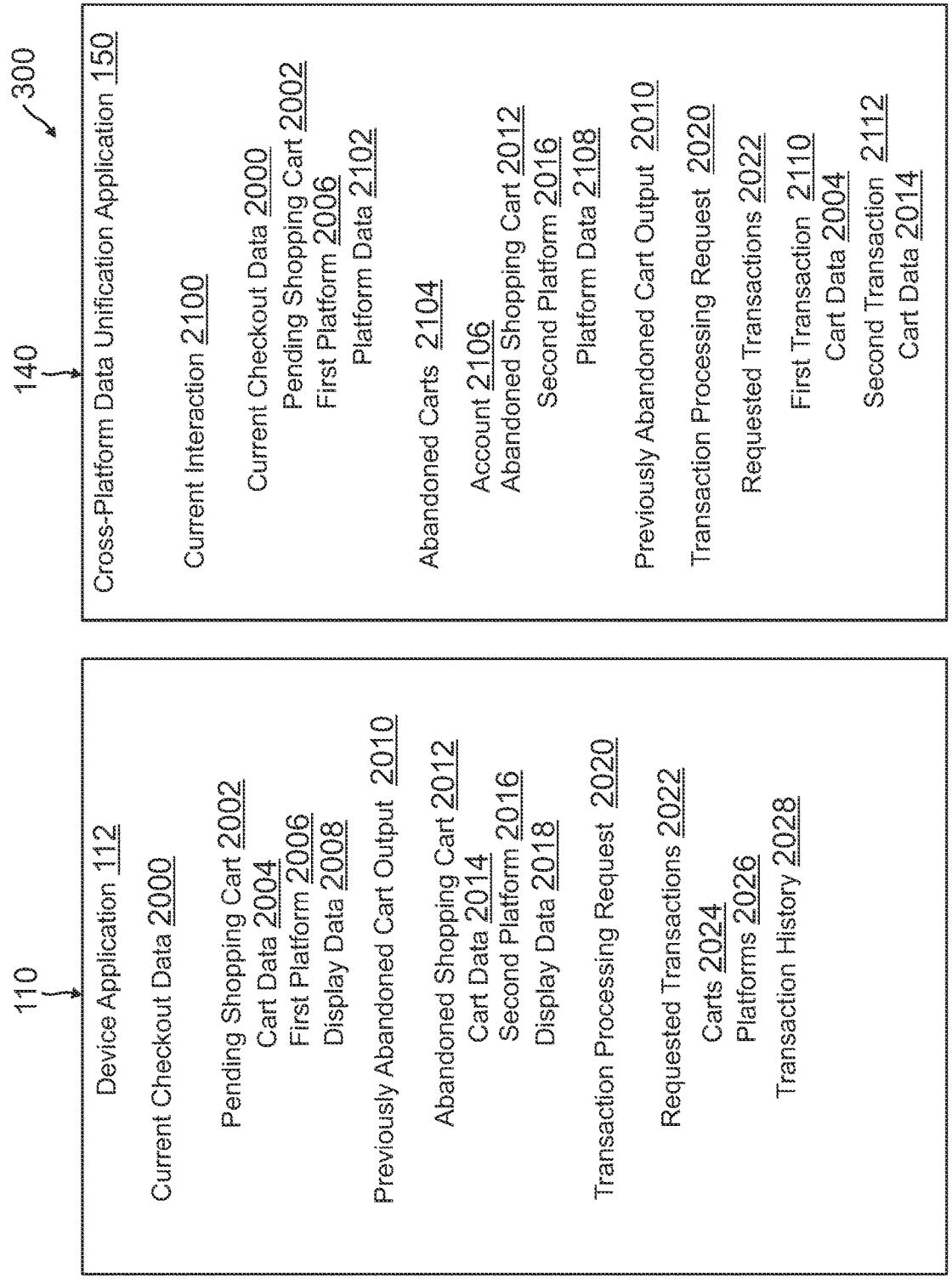
FIG. 3 is an exemplary system environment where a communication device and a service provider may interact to provide cross-platform tracking of user generated data for unified data output, according to an embodiment.

FIG. 3 is an exemplary system environment where a communication device and a service provider may interact to provide cross-platform tracking of user generated data for unified data output, according to an embodiment. FIG. 3 includes communication device 110 and transaction processor server 140 discussed in reference to system 100a of FIG. 1A.

In environment 300, communication device 110 executes device application 112 corresponding generally to the processes and features discussed in reference to system 100a of FIG. 1A. In this regard, communication device 110 may utilize device application 112 to execute one or more processes, which may include processes with an online resource, such as a merchant, to generate a digital shopping cart for purchase of one or more items. Device application 112 therefore includes current checkout data 2000 for a pending shopping cart 2002. Pending shopping cart 2002 includes cart data 2004 for items, payment information, shipping information, and/or totals of one or more items or services for purchase in pending shopping cart 2002. Pending shopping cart 2002 further is associated with a first platform 2006 and display data 2008 for cart data 2004 on first platform 2006.

In response to current checkout data 2000, transaction processor server 140 executes cross-platform data unification application 150 in environment 300, corresponding generally to the processes and features discussed in reference to system 100a of FIG. 1A. In this regard, transaction processor server 140 may utilize cross-platform data unification application 150 to receive current interaction 2100, which may include current checkout data 2000 from device application 112, which may include pending shopping cart 2002 with first platform 2006. Cross-platform data unification application 150 may further retrieve platform data 2102, which may include data formats, interfaces, and/or platform processes used to output data to users of digital shopping carts.

In response to current interaction 2100, cross-platform data unification application 150 may access abandoned carts 2104 for an account 2106 associated with current interaction 2100. Abandoned carts 2104 for account 2106 may include an abandoned shopping cart 2012 previously generated by device application 112 and/or using account 2106. Abandoned shopping cart 2012 may be associated with a second platform 2016, which may similarly have platform data 2108. Using abandoned shopping cart 2012 with current interaction 2100, such as current checkout data 2000 for first platform 2006 and platform fata 2102 for first platform 2006, previously abandoned cart output 2010 may be generated by cross-platform data unification application 150.

Communication device 110 may then receive previously abandoned cart output 2010, which may be output with current checkout data 2000. Previously abandoned cart output 20910 may include abandoned shopping cart 2012, which may be output with cart data 2014 for second platform 2016 using display data 2018. Device application 112 may be used to enter transaction processing request 2020 for one or more of pending shopping cart 2002 and abandoned shopping cart 2012. For example, transaction processing request 2929 may include requested transactions 2022 for carts 2024 on platforms 2026. Transaction processing request 2020 may be provided to cross-platform data unification application 150, which may use requested transactions 2022 to process a first transaction 2110 for cart data 2004 in pending shopping cart 2002 and a second transaction 2112 for cart data 2014 in abandoned shopping cart 2012. After processing by another electronic transaction processing process of transaction processor server 140, device application 112 may receive and output transaction history 2028.

Figure 4:
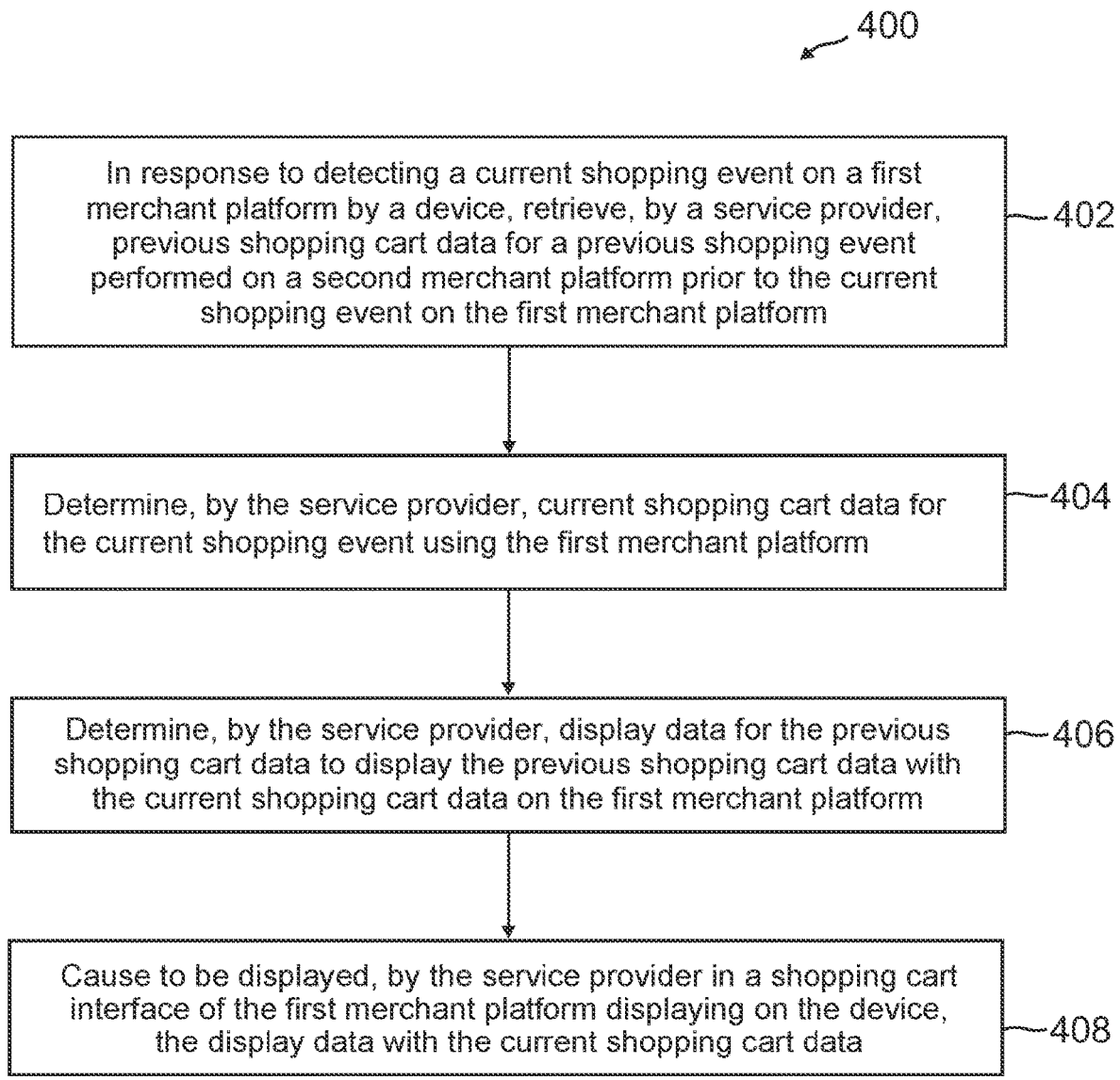
FIG. 4 is a flowchart of an exemplary process for cross-platform tracking of user generated data for unified data output, according to an embodiment.

FIG. 4 is a flowchart of an exemplary process for cross-platform tracking of user generated data for unified data output, according to an embodiment. Note that one or more steps, processes, and methods described herein may be omitted, performed in a different sequence, or combined as desired or appropriate.

At step 402 of a flowchart 400 in FIG. 4, in response to detecting a current shopping event on a first merchant platform by a device, a service provider retrieves previous shopping cart data for a previous shopping event performed on a second merchant platform prior to the current shopping event on the first merchant platform. The previous shopping cart data may comprise an item added to a shopping cart on the second merchant platform, wherein the shopping cart is not processed in a transaction to purchase the item. The previous shopping cart data may be received in response to failing to process the previous shopping cart data on the second merchant platform prior to one of navigating away from the second merchant platform, closing an interface window of the second merchant platform that comprises the previous shopping cart data, exiting an application associated with the second merchant, or navigating to a different application from the application. For example, the first merchant platform and the second merchant platform may be accessed through at least one of a web browser application or a dedicated application executing on the device. The first merchant platform and the second merchant platform may also comprise one of an online merchant sales platform specifically for the first merchant or the second merchant or a merchant marketplace for a plurality of merchants including one of the first merchant or the second merchant.

Detecting the current shopping event may comprise receiving user input during an electronic shopping session on the first merchant platform, wherein the user input comprises at least one of selecting an item for viewing on the first merchant platform, adding the item to the current shopping cart data on the first merchant platform, or requesting checkout of the current shopping cart data for electronic transaction processing on the first merchant platform. At step 404, current shopping cart data for the current shopping event is determined by the service provider using the first merchant platform. Display data for the previous shopping cart data is determined, by the service provider, to display the previous shopping cart data with the current shopping cart data on the first merchant platform, at step 406.

The service provider then causes to be displayed, in a shopping cart interface of the first merchant platform displaying on the device, the display data with the current shopping cart data, at step 408. The service provider may then receive a transaction processing request for one or more of the previous shopping cart data and the current shopping cart data, and may process the data using an account used to generate the data. Where both the previous and the current shopping cart data are requested to be processed using the account, two transactions may be generated and processed with the first merchant platform and the second merchant platform. The first transaction may be with the first merchant platform for the current shopping cart data and the second transaction may be with the second merchant platform for the previous shopping cart data. However, where only one shopping cart data is requested to be processed, the other shopping cart data may be removed from the interface and/or transaction request, and only the requested shopping cart data may be processed.

In various embodiments, a merchant platform may also perform one or more of the processes discussed above. For example, a first merchant platform may receive from a device a selection of an item to add to a first digital shopping cart on a first merchant platform. The first merchant platform may then generate the first digital shopping cart on the first merchant platform using the selection and receive a checkout request for the first digital shopping cart. In response to an executable process (e.g., a code snippet or other executable process integrated in the first merchant platform) of an electronic transaction processing system detecting the checkout request for the first digital shopping cart, the first merchant platform may then receive output data for a second digital shopping cart previously generated with a second merchant platform from the electronic transaction processing system. The executable process is therefore implemented as a code package into an electronic transaction processing process of the first merchant platform with the electronic transaction processing system, wherein the executable process is provided by the electronic transaction processing system, and wherein the executable process allows for communications between the first merchant platform and the second merchant platform using the electronic transaction processing system. The electronic transaction processing system generate the output data for the first merchant platform based on the second digital shopping cart stored to the electronic transaction processing system after at least one of the device and an account associated with the device or the first digital shopping cart abandons the second digital shopping cart on the second merchant platform.

The first merchant platform may generate a checkout interface on the first merchant platform using the first digital shopping cart and the output data, wherein the checkout interface displays the first digital shopping cart with the second digital shopping cart using the first digital shopping cart and the output data. The checkout interface may then be communicated to the device.

Additionally, the first merchant platform may receive a transaction processing request in the checkout interface for the first digital shopping cart and the second digital shopping cart, and may transmit the transaction processing request to the electronic transaction processing system, wherein electronic transaction processing system generates a shadow digital shopping cart representing the data for the second digital shopping cart with the second merchant platform and processes a transaction for the shadow digital shopping cart with the second merchant platform, and wherein electronic transaction processing system processes the first digital shopping cart with the first merchant platform. The first merchant platform may then receive a transaction history from the electronic transaction processing system for the second digital shopping cart processed by the electronic transaction processing system.

Figure 5:
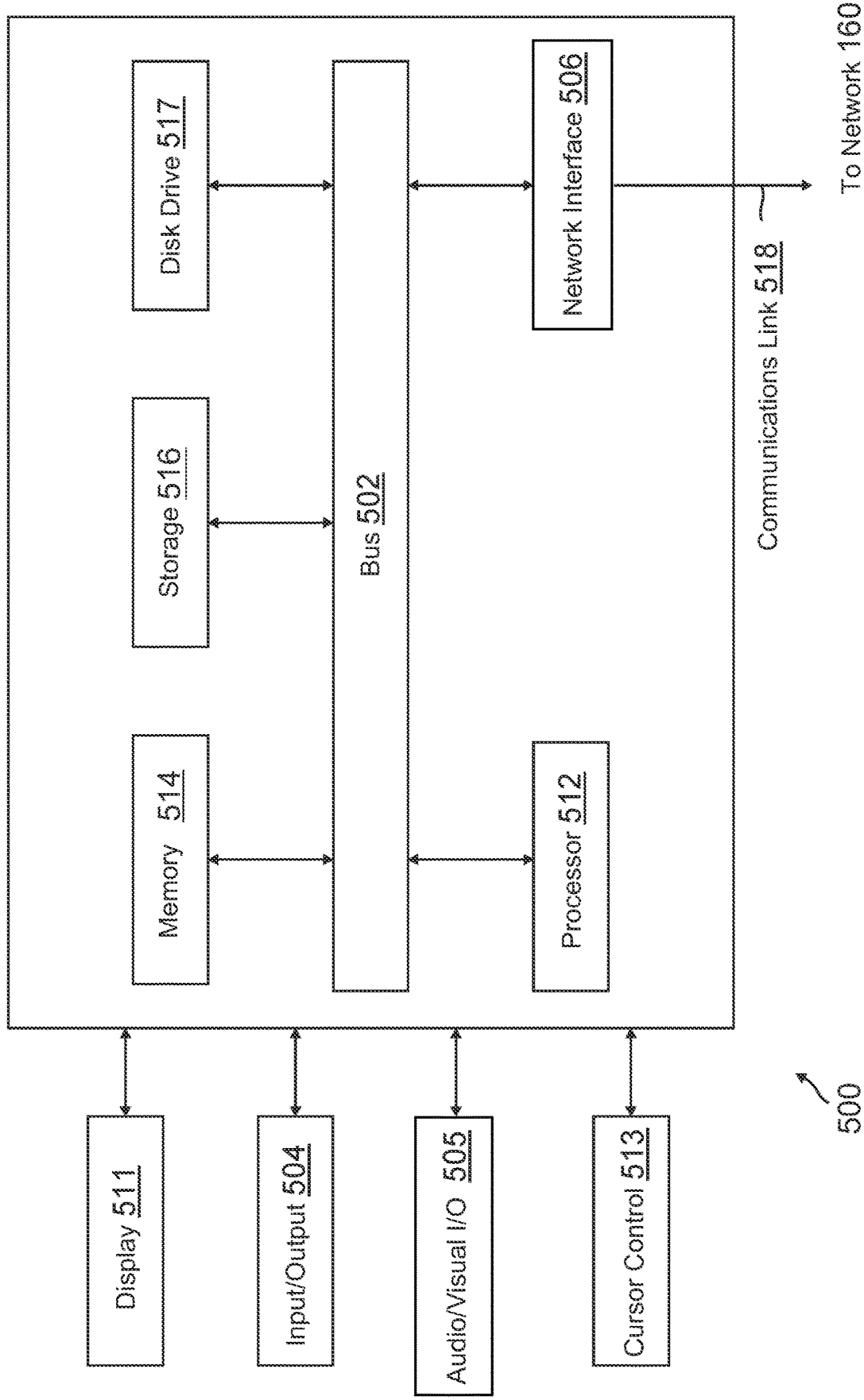
FIG. 5 is a block diagram of a computer system suitable for implementing one or more components in FIG. 1A, according to an embodiment.

FIG. 5 is a block diagram of a computer system suitable for implementing one or more components in FIG. 1A, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for cross-platform digital shopping cart processing, the method comprising:
    determining, by a one or more hardware processors, a cart abandonment event at a first merchant platform, the cart abandonment event indicating an abandoning of a first digital shopping cart by a user during a first session at the first merchant platform, wherein the first digital shopping cart is associated with first shopping cart data, wherein the first merchant platform is associated with a first data format for elements of the first shopping cart data for display using a first interface layout;
    detecting, by the one or more hardware processors, a creation of a second digital shopping cart based on one or more user selections by the user during a second session at a second merchant platform that is different from the first merchant platform, wherein the second digital shopping cart is associated with second shopping cart data, wherein the second merchant platform is associated with a second data format for elements of the second shopping cart data for display using a second interface layout;
    responsive to said detecting the creation of the second digital shopping cart, generating, by the one or more hardware processors, a unified view for the first digital shopping cart and the second digital shopping cart, the unified view for display during a checkout process in the second session at the second merchant platform, wherein said generating the unified view comprises converting the elements of the first shopping cart data to the second data format for display using the second interface layout of the second merchant platform;
    receiving, by the one or more hardware processors, a user request, via the unified view during the second session, to process both elements of the first digital shopping cart and elements of the second digital shopping cart;
    inputting, by the one or more hardware processors automatically without a user input or a navigation by the user to the first merchant platform, the elements of the first shopping cart to a cloned digital shopping cart of the first digital shopping cart with the first merchant platform;
    recreating, by the one or more hardware processors based on the inputting without the user input or the navigation to the first merchant platform, the first digital shopping cart as the cloned digital shopping cart with the first merchant platform; and
    processing, by the one or more hardware processors, the second digital shopping cart at the second merchant platform and the copy of the first digital shopping cart at the first merchant platform.

2. The method of claim 1, further comprising:
    responsive to determining the cart abandonment event, storing, by the one or more hardware processors, the first shopping cart data of the first digital shopping cart as associated with the user; and
    determining, by the one or more hardware processors, that the second session is conducted by the user based on identifying the user based on user interaction with the second merchant platform.

3. The method of claim 1, wherein said determining the cart abandonment event comprises determining one of a redirection by the user from the first merchant platform during the first session, closing an interface window of the first merchant platform, on a user device of the user, that comprises the elements of the first shopping cart, exiting an application associated with the first merchant platform, or navigating to a different application from the application.

4. The method of claim 1, wherein the processing comprises:
    using, by the one or more hardware processors, an account associated with the user to submit the first digital shopping cart using a checkout process at a first merchant server associated with the first merchant platform and submit the first digital shopping cart using a checkout process at a second merchant server associated with the second merchant platform.

5. The method of claim 1, wherein the cart abandonment event is received from a code element implemented at the first merchant platform that monitors user interactions with the first merchant platform from a user device of the user.

6. The method of claim 1, wherein the first merchant platform is associated with a first data format for elements of the first shopping cart data for a checkout process at the first merchant platform;
    wherein said inputting is performed using the first data format for the checkout process at the first merchant platform.

7. The method of claim 1, further comprising:
    providing, by the one or more hardware processors, results of the processing of the second digital shopping cart and the cloned copy digital shopping cart via the unified view.

8. The method of claim 1, wherein the abandoning comprises one of a navigation away from the first digital shopping cart or a closure of an interface window having the first digital shopping cart.

9. A device, comprising:
    a non-transitory memory storing instructions; and
    a processor configured to execute the instructions to cause the device to:
        responsive to determining an abandonment of a first digital shopping cart at a first merchant platform by a user during a first session, store first shopping cart data associated with the first digital shopping cart, wherein the first merchant platform is associated with a first data format for elements of the first shopping cart data for display using a first interface layout;
        detect a second session where the user creates a second digital shopping cart at a second merchant platform that is different from the first merchant platform, wherein the second digital shopping cart is associated with second shopping cart data, and wherein the second merchant platform is associated with a second data format for elements of the second shopping cart data for display using a second interface layout;

responsive to detection of the second session, generate a unified view for the first digital shopping cart and the second digital shopping cart, the unified view for display during a checkout process in the second session at the second merchant platform, wherein generating the unified view comprises converting the elements of the first shopping cart data to the second data format for display using the second interface layout of the second merchant platform;

create a shadow digital shopping cart including the elements of the first digital shopping cart based on inputting the elements of the first shopping cart to the shadow digital shipping cart without a user input or navigation to the first merchant platform by the user, the shadow digital shopping cart for processing at the first merchant platform; and communicate with a second merchant server associated with the second merchant platform to process elements of the second digital shopping cart and communicate with a first merchant server associated with the first merchant platform to process elements of the shadow digital shopping cart.

10. The device of claim 9, wherein detecting the second session where the user creates the second digital shopping cart comprises determining that the second session is conducted by the user based on identifying the user based on user interaction with the second merchant platform.

11. The device of claim 9, wherein determining abandonment of the first digital shopping cart comprises determining one of a redirection by the user from the first merchant platform during the first session, closing an interface window of the first merchant platform, on a user device of the user, that comprises the elements of the first shopping cart, exiting an application associated with the first merchant platform, or navigating to a different application from the application.

12. The device of claim 9, wherein an indication of the abandonment is received from a code element implemented at the first merchant platform that monitors user interactions with the first merchant platform from a user device of the user.

13. The device of claim 9, wherein the first merchant platform is associated with a first data format for elements of the first shopping cart data for a checkout process at the first merchant platform;

wherein creating the shadow digital shopping cart is performed using the first data.

14. The device of claim 9, wherein the abandonment comprises one of a navigation away from the first digital shopping cart or a closure of an interface window having the first digital shopping cart.

15. A non-transitory machine-readable medium having instructions stored thereon, the instructions executable to cause performance of operations comprising:

responsive to determining an abandonment of a first digital shopping cart at a first merchant platform by a user during a first session, storing first shopping cart data associated with the first digital shopping cart, wherein the first merchant platform is associated with a first data format for elements of the first shopping cart data for display using a first interface layout;

detecting a second session where the user creates a second digital shopping cart at a second merchant platform that is different from the first merchant platform, wherein the second digital shopping cart is associated with second shopping cart data, and wherein the second merchant platform is associated with a second data format for elements of the second shopping cart data for display using a second interface layout;

responsive to the detecting of the second session, generating a unified view for the first digital shopping cart and the second digital shopping cart, the unified view for display during a checkout process in the second session at the second merchant platform, wherein said generating the unified view comprises converting the elements of the first shopping cart data to the second data format for display using the second interface layout of the second merchant platform;

creating a shadow digital shopping cart with the first merchant platform by inputting, automatically without a user input or navigation to the first merchant platform, the elements of the first digital shopping cart to the shadow digital shopping cart, the shadow digital shopping cart for processing at the first merchant platform; and communicating with a second merchant server associated with the second merchant platform to process elements of the second digital shopping cart and communicating with a first merchant server associated with the first merchant platform to process elements of the shadow digital shopping cart.

16. The non-transitory machine-readable medium of claim 15, wherein the detecting the second session where the user creates the second digital shopping cart comprises determining that the second session is conducted by the user based on identifying the user based on a user interaction with the second merchant platform.

17. The non-transitory machine-readable medium of claim 15, wherein said determining abandonment of the first digital shopping cart comprises determining one of a redirection by the user from the first merchant platform during the first session, closing an interface window of the first merchant platform, on a user device of the user, that comprises the elements of the first shopping cart, exiting an application associated with the first merchant platform, or navigating to a different application from the application.

18. The non-transitory machine-readable medium of claim 15, wherein an indication of the abandonment is received from a code element implemented at the first merchant platform that monitors user interactions with the first merchant platform from a user device of the user.

19. The non-transitory machine-readable medium of claim 15, wherein the first merchant platform is associated with a first data format for elements of the first shopping cart data for a checkout process at the first merchant platform;

wherein said creating the shadow digital shopping cart is performed using the first data.

20. The non-transitory machine-readable medium of claim 15, wherein the abandonment comprises one of a navigation away from the first digital shopping cart or a closure of an interface window having the first digital shopping cart.

* * * * *